United States Patent
Noh et al.

(10) Patent No.: US 12,069,673 B2
(45) Date of Patent: Aug. 20, 2024

(54) METHOD AND DEVICE FOR TRANSMITTING OR RECEIVING DATA IN WIRELESS COMMUNICATION SYSTEM

(71) Applicant: Samsung Electronics Co., Ltd., Suwon-si (KR)

(72) Inventors: Hoondong Noh, Suwon-si (KR); Youngwoo Kwak, Suwon-si (KR); Taehyoung Kim, Suwon-si (KR); Jinhyun Park, Suwon-si (KR); Cheolkyu Shin, Suwon-si (KR); Heecheol Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 17/268,746

(22) PCT Filed: Jul. 25, 2019

(86) PCT No.: PCT/KR2019/009256
§ 371 (c)(1),
(2) Date: Feb. 16, 2021

(87) PCT Pub. No.: WO2020/036334
PCT Pub. Date: Feb. 20, 2020

(65) Prior Publication Data
US 2021/0314927 A1    Oct. 7, 2021

(30) Foreign Application Priority Data
Aug. 16, 2018  (KR) .................. 10-2018-0095757

(51) Int. Cl.
*H04W 72/23* (2023.01)
*H04B 7/06* (2006.01)
*H04W 72/56* (2023.01)

(52) U.S. Cl.
CPC .......... *H04W 72/23* (2023.01); *H04B 7/0617* (2013.01); *H04W 72/56* (2023.01)

(58) Field of Classification Search
None
See application file for complete search history.

(56) References Cited

U.S. PATENT DOCUMENTS 10,652,876 B2    5/2020  Seo et al.
2019/0349964 A1*  11/2019  Liou ............... H04W 76/27
(Continued)

FOREIGN PATENT DOCUMENTS

EP    3 809 650 A1    4/2021
KR    10-2020-0009911 A    1/2020
(Continued)

OTHER PUBLICATIONS

CMCC, Discussion on remaining issues for unicast PDCCH in CORESET#0, R1-1806361, 3GPP TSG RAN WG1 Meeting 93, May 12, 2018, Busan, Korea.
(Continued)

*Primary Examiner* — Clemence S Han
(74) *Attorney, Agent, or Firm* — Jefferson IP Law, LLP

(57) ABSTRACT

According to an embodiment of the disclosure, there is provided a method, performed by a base station, of configuring beam information of a physical downlink control channel (PDCCH) in a wireless communication system, the method including: configuring at least one or more transmission configuration indication (TCI) states connected to a control resource set (CORESET) through radio resource control (RRC); indicating a TCI state including the beam information of the PDCCH among the at least one or more TCI states through a medium access control control element (MAC CE); and transmitting the PDCCH, based on the TCI state including the beam information of the PDCCH.

20 Claims, 17 Drawing Sheets

(56) References Cited

U.S. PATENT DOCUMENTS

| | | | |
|---|---|---|---|
| 2020/0053757 A1* | 2/2020 | Bagheri | H04L 5/0058 |
| 2021/0037575 A1* | 2/2021 | Ohara | H04W 72/20 |
| 2021/0050936 A1* | 2/2021 | Seo | H04L 5/0053 |
| 2021/0058906 A1* | 2/2021 | Seo | H04W 16/28 |

FOREIGN PATENT DOCUMENTS

| | | |
|---|---|---|
| WO | 2017/160100 A2 | 9/2017 |
| WO | 2019/244222 A1 | 12/2019 |

OTHER PUBLICATIONS

Nokia et al., Introduction of MAC CEs for NR MIMO, R2-1803796, 3GPP TSG-RAN WG2 #101, Mar. 14, 2018, Athens, Greece.

Korean Office Action dated Jan. 6, 2023, issued in Korean Application No. 10-2018-0095757.

Intel Corporation, "Remaining Issues on Beam Management", 3GPP TSG RAN WG1 Meeting #94, Gothenburg, Sweden, Aug. 20-24, 2018 2018, R1-1808669, Aug. 11, 2018.

NTT DOCOMO, "Remaining issues on beam management", 3GPP TSG RAN WG1 Meeting #94, Gothenburg, Sweden, Aug. 20-24, 2018, R1-1809138, Aug. 11, 2018.

Vivo, "Remaining issues on beam measurement and reporting", 3GPP TSG RAN WG1 Meeting #94, Gothenburg, Sweden, Aug. 20-24, 2018, R1-1808221, Aug. 10, 2018.

Nokia et al., "PDCCH TCI state during HO and in CORESET#0", 3GPP TSG-RAN WG2 Meeting NR Adhoc 1807, Montreal, Canada, Jul. 2-6, 2018, R2-1810300, Jun. 21, 2018.

International Search Report dated Oct. 28, 2019, issued in International Patent Application No. PCT/KR2019/009256.

Vivo: "MAC CEs format for beam management", 3GPP Draft; R2-1801995, Feb. 14, 2018, XP051399070.

Extended European Search Report dated Sep. 3, 2021, issued in European Patent Application No. 19849166.4-1215.

Korean Office Action with English translation dated Jan. 22, 2024; Korean Appln. No. 10-2018-0095757.

Korean Office Action with English translation dated Jul. 19, 2023; Korean Appln. No. 10-2018-0095757.

European Search Report dated Sep. 12, 2023; European Appln. No. 19 849 166.4-1215.

* cited by examiner

METHOD AND DEVICE FOR TRANSMITTING OR RECEIVING DATA IN WIRELESS COMMUNICATION SYSTEM

TECHNICAL FIELD

The disclosure relates to a method and device for configuring a beam of a downlink control channel in a wireless communication system.

BACKGROUND ART

To meet the increasing demand with respect to wireless data traffic after the commercialization of the 4th generation (4G) communication system, efforts to develop an enhanced 5th generation (5G) communication system or a pre-5G communication system are continuing. For this reason, a 5G communication system or pre-5G communication system is called a Beyond 4G Network communication system or a Post Long Term Evolution (LTE) system.

To achieve a high data transmission rate, the implementation of a 5G communication system in an ultra-high-frequency (mmWave) band (for example, a 60 GHz band) is being considered. To reduce path loss of radio waves and increase a transfer distance of radio waves in an ultra-high-frequency band, in a 5G communication system, technologies for beamforming, massive multiple input multiple output (MIMO), full dimensional MIMO (FD-MIMO), array antenna, analog beam-forming, and large-scale antenna are being discussed.

Also, to improve networks of systems, various technologies, such as advanced small cell, cloud radio access network (cloud RAN), ultra-dense networks, device to device (D2D) communication, wireless backhaul, moving networks, cooperative communication, coordinated multi-points (CoMP), and interference cancellation, have been developed for 5G communication systems. In addition, other technologies, such as hybrid FSK and QAM modulation (FQAM) and sliding window superposition coding (SWSC) based on advanced coding modulation (ACM) and non-orthogonal multiple access (NOMA) and sparse code multiple access (SCMA) based filter bank multi carrier (FBMC), have been developed for 5G communication systems.

Meanwhile, the Internet is evolving from a human-centered network in which humans generate and consume information to an Internet of Things (IoT) network in which distributed components such as objects transmit and receive information and process it. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet Technology (IT) service is provided to collect and analyze data generated by connected objects to create new value in human life. The IoT may be applied to various fields, such as smart homes, smart buildings, smart cities, smart cars/connected cars, smart grids, health care, smart appliances, and advanced medical services, through convergence and combination between existing Information Technology (IT) and various industries.

Accordingly, various attempts to apply a 5G communication system to an IoT network are being made. For example, technologies, such as a sensor network, M2M communication, and MTC, are implemented by technologies, such as beam forming, MIMO, and array antenna, which are 5G communication technologies. Applying a cloud radio access network (CRAN) as big data processing technology also is an example of the convergence of 5G technology and IoT technology.

DESCRIPTION OF EMBODIMENTS

Solution to Problem

The disclosure provides a method and device for configuring a beam of a downlink control channel in a wireless communication system.

BEST MODE

Figure 1:
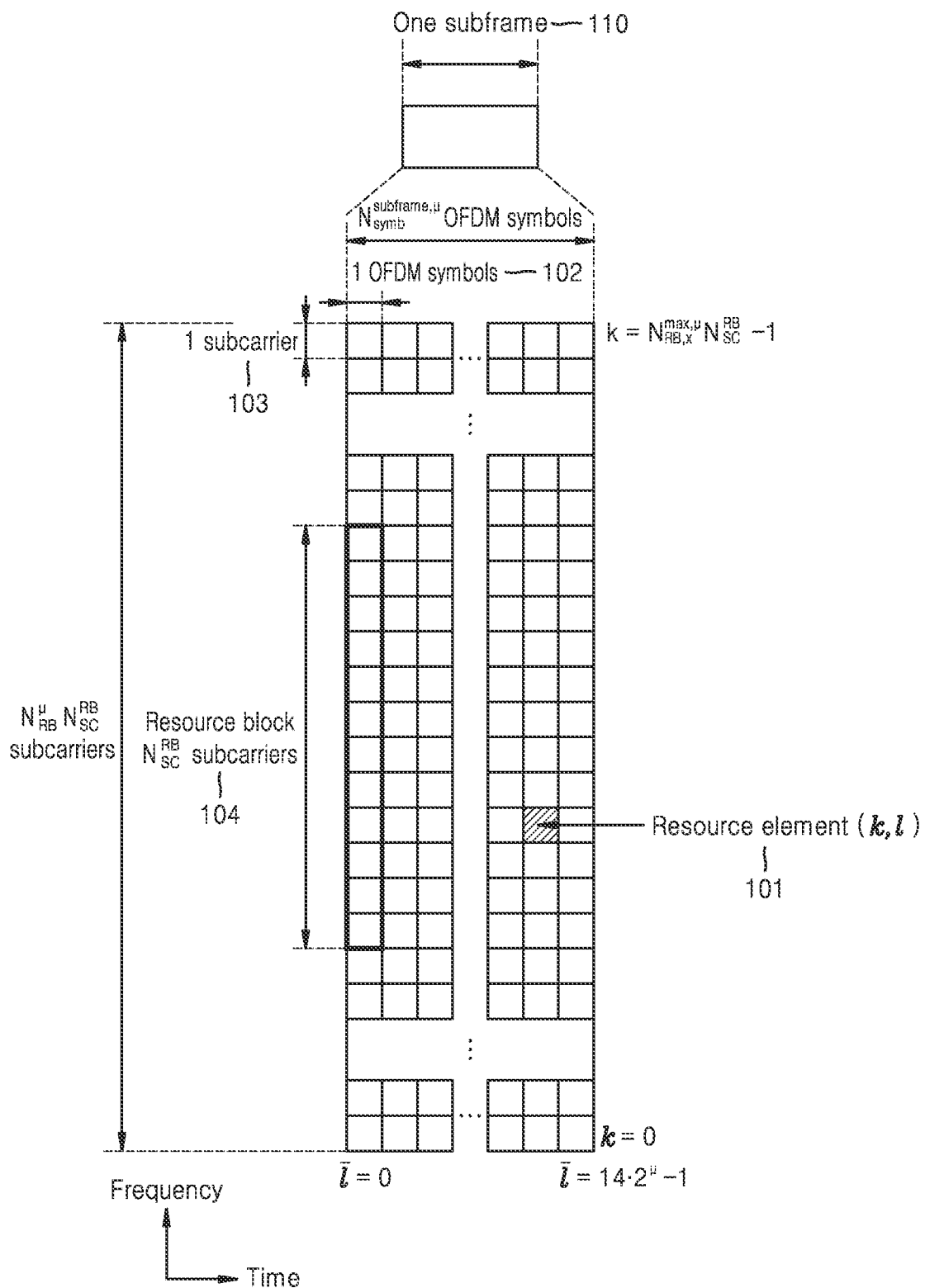
FIG. 1 illustrates a basic structure of a time-frequency domain, according to an embodiment of the disclosure.

According to an embodiment of the disclosure, there is provided a method, performed by a base station, of configuring beam information of a physical downlink control channel (PDCCH) in a wireless communication system, the method including: configuring at least one or more transmission configuration indication (TCI) states connected to a control resource set (CORESET) through radio resource control (RRC); indicating a TCI state including the beam information of the PDCCH among the at least one or more TCI states through a medium access control control element (MAC CE); and transmitting the PDCCH, based on the TCI state including the beam information of the PDCCH.

Mode of Disclosure

Hereinafter, an operation principle of the disclosure will be described in detail with reference to the accompanying drawings. However, when detailed descriptions about known functions or configurations associated with the disclosure are determined to unnecessarily obscure the gist of the disclosure, the detailed descriptions will be omitted. Although the following terms are defined in consideration of the functions of the disclosure, they may vary according to a user or operator's intentions, judicial precedents, etc. Hence, the terms must be defined based on the contents of the entire specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to an embodiment of the disclosure, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more Central Processing Units (CPUs) in a device or a security multimedia card. Also, in the embodiments, the 'portion', 'module' or 'unit' may include one or more processors.

In the disclosure, downlink (DL) means a wireless transmission path of signals transmitted from a base station to a UE, and uplink (UL) means a wireless transmission path of signals transmitted from a UE to a base station. Also, hereinafter, embodiments of the disclosure are described based on an example of a LTE or LTE-A system, however, the embodiments of the disclosure may also be applied to other communication systems having similar technical backgrounds or channel types. For example, 5G mobile communication technologies (5G and new radio (NR)) that are developed after LTE-A may be included in systems to which the embodiments of the disclosure can be applied, and, in the following description, 5G may be a concept including existing LTE, LTE-A, and similar other services. Also, the disclosure may be applied to other communication systems through slight modifications within a range that does not greatly deviate from the scope of the disclosure, under a determination of a person having a skilled technical knowledge.

In the following descriptions, the terms used to identify connected nodes, the terms indicating network entities, the terms indicating messages, the terms indicating interfaces between network objects, the terms indicating various identification information, etc. are examples for convenience of description. Accordingly, the disclosure is not limited to these terms, and other terms having the equivalent technical meaning may be used.

Hereinafter, for convenience of description, the disclosure uses terms and names defined in a 3rd Generation Partnership Project Long Term Evolution (3GPP LTE) standard. However, the disclosure is not limited to the terms and names, and may be applied in the same way to a system based on another standard.

However, when detailed descriptions about known techniques associated with the disclosure are determined to unnecessarily obscure the gist of the disclosure, the detailed descriptions will be omitted. Hereinafter, an embodiment of the disclosure will be described with reference to the accompanying drawings.

Wireless communication systems have passed initial stages of providing voice-based services, and are being developed to wide-band wireless communication systems of providing high-speed, high-quality packet data services, such as, for example, High Speed Packet Access (HSPA) of the 3GPP, LTE or Evolved Universal Terrestrial Radio Access (E-UTRA), LTE-Advanced (LTE-A), LTE-Pro, High Rate Packet Data (HRPD) of the 3GPP2, Ultra Mobile Broadband (UMB), and communication standards of the IEEE 802.16e and the like.

A representative example of the wide-band wireless communication systems is a LTE system. The LTE system adopts an Orthogonal Frequency Division Multiplexing (OFDM) method in a downlink (DL), and a Single Carrier Frequency Division Multiple Access (SC-FDMA) method in an uplink (UL). The uplink refers to a wireless link in which a UE or a mobile station (MS) transmits data or control signals to a base station (BS) (or eNode B), and the downlink refers to a wireless link in which a base station transmits data or control signals to a UE. A multiple access method assigns and operates time-frequency resources on which data or control information is transmitted for individual users such that the time-frequency resources do not overlap, that is, such that orthogonality is fulfilled, thereby distinguishing data or control information of the individual users from each other.

Future communication systems beyond the LTE, that is, 5G communication systems need to freely reflect various requirements from users, service providers, etc., and therefore, the 5G communication systems need to support services fulfilling various requirements simultaneously. Services considered for 5G communication systems include Enhanced Mobile BroadBand (eMBB), massive Machine Type Communication (mMTC), Ultra Reliability Low Latency Communication (URLLC), etc.

eMBB is aimed to provide a more enhanced data rate than that supported by existing LTE, LTE-A or LTE-Pro. For example, in a 5G communication system, eMBB needs to provide a peak data rate of 20 Gbps in a downlink and a peak data rate of 10 Gbps in an uplink with respect to a base station. Also, the 5G communication system needs to provide a high user perceived data rate, while providing a peak data rate. To fulfill the requirements, the 5G communication system requires an improvement of various transmission/reception technologies including more enhanced Multi Input Multi Output (MIMO) transmission technology. Also, while transmitting signals by using a maximum transmission bandwidth of 20 MHz in a 20 GHz band used by existing LTE, the 5G communication system uses a wider frequency bandwidth than 20 MHz in a frequency band of 3 to 6 GHz or more, thereby fulfilling a required data rate.

Also, mMTC is considered to support application services such as Internet of Thing (IoT) in the 5G communication system. The mMTC requires supporting connections to massive UEs, UE coverage enhancement, improved battery life, UE cost reduction, etc. in a cell to efficiently provide the IoT. The IoT is connected to various sensors and devices to provide a communication function. Therefore, the mMTC needs to support a large number of UEs (for example, 1,000,000 UEs/km2) in a cell. Also, because UEs supporting the mMTC have a high probability of being located in shadow zones such as the basements of buildings, which are not covered by a cell, due to service characteristics, the mMTC may require wider coverage compared to those required by other services that 5G communication systems provide. The UEs supporting the mMTC need to be low-cost UEs, and require long battery life time, such as 10 years to 15 years, because they have difficulties in frequently replacing the batteries.

Finally, URLLC is a mission-critical cellular-based wireless communication service. For example, services, etc. used in remote control for robots or machinery, industrial automation, unmanned aerial vehicle, remote health care, emergency alert, etc. may be considered. Accordingly, communication provided by the URLLC should provide ultra-low latency and ultra-high reliability. For example, a service supporting the URLLC needs to satisfy air interface latency that is shorter than 0.5 milliseconds, while having a requirement of a packet error rate that is equal to or lower than 10-5. Accordingly, for services supporting the URLLC, the 5G system needs to provide a shorter Transmit Time Interval (TTI) than other services, while requiring a design of assigning a wide resource in a frequency band to secure the reliability of communication links.

Three services of 5G, that is, eMBB, URLLC, and mMTC may be multiplexed and transmitted in one system. In this case, to fulfill different requirements of the individual services, the system may use different transmission/reception technologies and different transmission/reception parameters for the services.

Hereinafter, a frame structure of a 5G system will be described in detail with reference to the accompanying drawings.

FIG. 1 illustrates a basic structure of a time-frequency domain that is a radio resource domain in which data or a control channel is transmitted in a 5G system.

In FIG. 1, the horizontal axis represents a time domain, and the vertical axis represents a frequency domain. In the time and frequency domains, a basic unit of a resource may be a resource element (RE) 101, and may be defined as one Orthogonal Frequency Division Multiplexing (OFDM) symbol 102 on a time axis and one subcarrier 103 on a frequency axis. In the frequency domain, $N_{sc}^{RB}$ (for example, 12) successive REs may configure one Resource Block (RB) 104.

Figure 2:
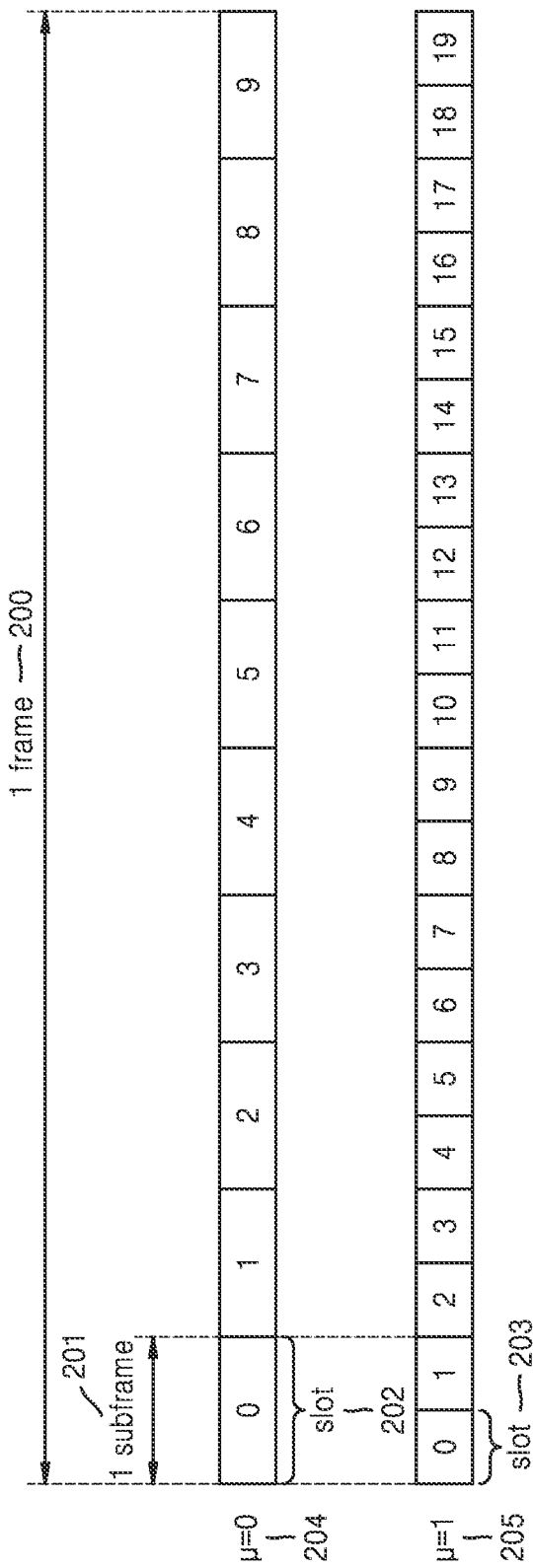
FIG. 2 illustrates structures of a frame, a subframe, and a slot, according to an embodiment of the disclosure.

FIG. 2 illustrates a slot structure that is considered in a 5G system.

In FIG. 2, examples of a frame 200, a subframe 201, and a slot 202 are illustrated. One frame 200 may be defined as 10 ms. One subframe 201 may be defined as 1 ms, and accordingly, one frame 200 may be configured with a total of 10 subframes 201. One slot 202 or 203 may be defined as 14 OFDM symbols (that is, the number $N_{symb}^{slot}$ of symbols per one slot=14). One subframe 201 may be configured with one or plurality of slots 202 and 203, and the number of slots 202 or 203 per one subframe 201 may depend on a configuration value (μ) 204 or 205 for a subcarrier spacing. In an example of FIG. 2, a case in which a configuration value for a subcarrier spacing is 0 (μ=0, 204) and a case in which a configuration value for a subcarrier spacing is 1 (μ=1, 205) are illustrated. In the case of μ=0 (204), one sub frame 201 may be configured with one slot 202, and in the case of μ=1 (205), one sub frame 201 may be configured with two slots 203. That is, the number $N_{slot}^{subframe,\mu}$ of slots per one subframe may change according to a configuration value for a subcarrier spacing, and accordingly, the number $N_{slot}^{frame,\mu}$ of slots per one frame may also change. $N_{slot}^{subframe,\mu}$ and $N_{slot}^{frame,\mu}$ according to configuration values for a subcarrier spacing may be defined in Table 1 below.

TABLE 1

| μ | $N_{symbd}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Hereinafter, a Bandwidth Part (BWP) configuration in a 5G communication system will be described in detail with reference to the accompanying drawings.

Figure 3:
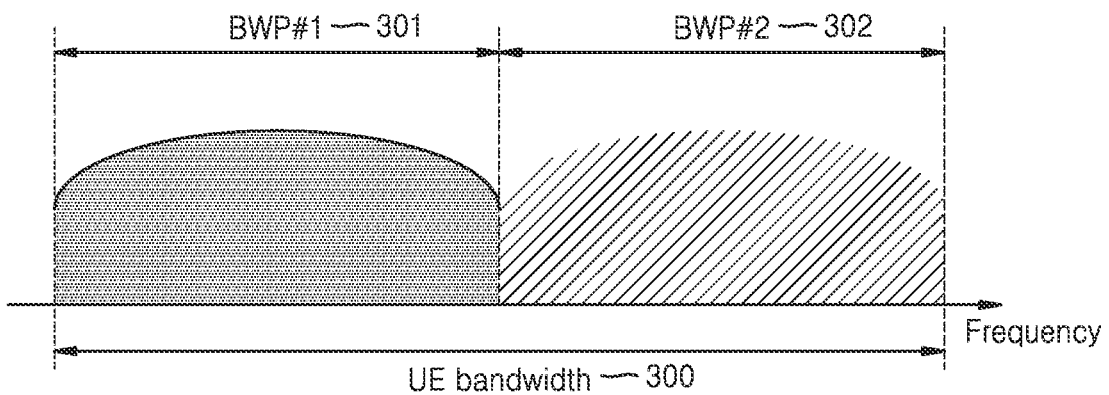
FIG. 3 illustrates an example of a bandwidth part configuration, according to an embodiment of the disclosure.

FIG. 3 illustrates an example of a bandwidth part configuration in a 5G communication system.

FIG. 3 illustrates an example in which a UE bandwidth 300 is configured with two bandwidth parts, that is, a bandwidth part #1 301 and a bandwidth part #2 302. A base station may configure one or plurality of bandwidth parts for a UE, and configure information of Table 2 for each bandwidth part.

TABLE 2

| BWP ::= | SEQUENCE { |
|---|---|
| bwp-Id (bandwidth part identifier) | BWP-Id, |
| locationAndBandwidth (bandwidth part location) | INTEGER (1..65536), |
| subcarrierSpacing (subcarrier spacing | ENUMERATED {n0, n1, n2, n3, n4, n5}, |
| cyclicPrefix (cyclic prefix) | ENUMERATED { extended } |
| } | |

The base station may configure, in addition to the configuration information, various parameters related to the bandwidth parts for the UE. The base station may transfer the information to the UE through higher layer signaling, for example, radio resource control (RRC) signaling. At least one bandwidth part among the configured one or plurality of bandwidth parts may be activated. Information about whether the configured bandwidth parts are activated may be transferred from the base station to the UE, semi-statically through RRC signaling, or dynamically through downlink control information (DCI).

The UE, which has not established a RRC connection, may receive a configuration of an initial BWP for an initial access from the base station through a Master Information Block (MIB). More particularly, the UE may receive, through a MIB in an initial access stage, configuration information for a search space and a control resource set (CORESET) being a control area in which a Physical Downlink Control Channel (PDCCH) is transmittable in order to receive system information required for an initial access. The system information required for the initial access may be, for example, Remaining System Information (RMSI) or System Information Block 1 (SIB1).

The control resource set and search space configured through the MIB may be considered as an identity (ID) 0. The base station may notify the UE of configuration information, such as frequency assignment information, time assignment information, and numerology, for a control resource set #0, through the MIB. Also, the base station may notify the UE of configuration information (that is, configuration information for a search space #0) about a monitoring cycle and occasion for the control resource set #0 through the MIB. The UE may consider a frequency area set to the control resource set #0, obtained from the MIB, as an initial bandwidth part for an initial access. At this time, an ID of the initial bandwidth part may be considered as 0.

Configurations for bandwidth parts supported by 5G may be used for various purposes.

For example, when a bandwidth supported by a UE is narrower than a system bandwidth, the bandwidth may be complemented through a bandwidth part configuration as described above. For example, as shown in Table 2, by configuring a frequency location (configuration information 2) of a bandwidth part for a UE, the UE may transmit and receive data at a specific frequency location in a system bandwidth.

According to another example, a base station may configure a plurality of bandwidth parts for a UE for the purpose of supporting different numerologies. For example, to support data transmission/reception using a subcarrier spacing of 15 kHz and a subcarrier spacing of 30 kHz for a certain UE, a base station may configure two bandwidth parts with subcarrier spacings of 15 kHz and 30 kHz. The different bandwidth parts may be frequency division multiplexed. When data is transmitted and received with a specific subcarrier spacing, a bandwidth part configured with the corresponding subcarrier spacing may be activated.

According to another example, for the purpose of power consumption reductions in UEs, a base station may configure bandwidth parts having different sizes of bandwidths for the UEs. For example, when a UE supports a relatively wide bandwidth, for example, a bandwidth of 100 MHz and always transmits and receives data with the corresponding bandwidth, relatively great power consumption may be caused. Particularly, a case in which a UE unnecessarily monitors a downlink control channel through a relatively wide bandwidth of 100 MHz when there is no traffic may be inefficient in view of power consumption. For the purpose of reducing power consumption of the UE, the base station may configure a bandwidth part of a relatively narrow bandwidth, for example, a bandwidth part of 20 MHz, for the UE. When there is no traffic, the UE may perform a monitoring operation in the bandwidth part of 20 MHz, and, when data is generated, the UE may transmit and receive data with a bandwidth part of 100 MHz according to an indication from the base station.

In a method of configuring a bandwidth part, UEs, which have not established a RRC connection, may receive, in an initial access stage, configuration information for an initial bandwidth part through a MIB. More particularly, a UE may receive, from a MIB of a Physical Broadcast Channel (PBCH), a configuration of a CORESET for a downlink control channel in which DCI for scheduling a System Information Block (SIB) is transmittable. A bandwidth of the CORESET set according to the MIB may be considered as an initial bandwidth part, and the UE may receive a Physical Downlink Shared Channel (PDSCH) in which a SIB is transmitted, through the initial bandwidth part. The initial bandwidth part may be used for Other System Information (OSI), Paging, and Random Access, as well as for receiving the SIB.

Hereinafter, a Synchronization Signal (SS)/PBCH block in 5G will be described.

The SS/PBCH block means a physical layer channel block configured with a Primary SS (PSS), a Secondary SS (SSS), and a PBCH, which are in detail as follows.

PSS: reference signal for downlink time/frequency synchronization, which provides information about a part of a cell ID.

SSS: reference for downlink time/frequency synchronization, which provides information about the remaining part of the cell ID, not provided by the PSS. Additionally, the SSS functions as a reference signal for demodulating a PBCH.

PBCH: provides essential system information required for transmission/reception of a data channel and control channel of a UE. The essential system information may include search space-related control information representing radio resource mapping information of the control channel, scheduling control information for an extra data channel transmitting system information, etc.

SS/PBCH block: the SS/PBCH block may include a PSS, a SSS, and a PBCH. One or plurality of SS/PBCH blocks may be transmitted within a time period of 5 ms. The respective SS/PBCH blocks that are transmitted may be distinguished by indices.

The UE may detect a PSS and a SSS and decode a PBCH, in an initial access stage. The UE may obtain a MIB from the PBCH and receive a configuration of a control resource set #0 from the MIB. The UE may assume that a selected SS/PBCH block and a Demodulation Reference Signal (DMRS) transmitted from the control resource set #0 are Quasi Co-Located (QCL), and monitor the control resource set #0. The UE may receive system information as downlink control information transmitted from the control resource set #0. The UE may obtain Random Access Channel (RACH)-related configuration information required for an initial access from the received system information. The UE may transmit a Physical RACH (PRACH) to the base station by considering a SS/PBCH index selected by itself, and the base station may receive the PRACH to obtain information about the SS/PBCH block index selected by the UE. Thereby, the base station may recognize a block selected by the UE from among SS/PBCH blocks and a fact that the UE monitors the control resource set #0 related to the selected block.

Hereinafter, DCI in a 5G system will be described in detail.

In a 5G system, scheduling information for uplink data (or a Physical Uplink Shared Channel (PUSCH)) or downlink data (or a Physical Downlink Shared Channel (PDSCH)) may be transferred from a base station to a UE through DCI. The UE may monitor a fallback DCI format and a non-fallback DCI format for a PUSCH or PDSCH. The fallback DCI format may include a fixed field defined in advance between the base station and the UE, and the non-fallback DCI format may include a configurable field.

The DCI may be subject to channel coding and modulation and then transmitted through a Physical Downlink Control Channel (PDCCH). Cyclic Redundancy Check (CRC) may be attached to a DCI message payload. The CRC may be scrambled by a Radio Network Temporary Identifier (RNTI) corresponding to identity of the UE. Different RNTIs may be used according to purposes of DCI messages, for example, UE-specific data transmission, a power control command, a random access response, etc. That is, the RNTI may be included in a CRC computation process and transmitted, instead of being explicitly transmitted. When the UE receives a DCI message transmitted on a PDCCH, the UE may check CRC by using an assigned RNTI. When a result of the CRC check is correct, the UE may determine that the corresponding message is a message transmitted to the UE.

For example, DCI scheduling a PDSCH for system information (SI) may be scrambled by SI-RNTI. DCI scheduling a PDSCH for a Random Access Response (RAR) message may be scrambled by RA-RNTI. DCI scheduling a PDSCH for a paging message may be scrambled by P-RNTI. DCI notifying a Slot Format Indicator (SFI) may be scrambled by SFI-RNTI. DCI notifying Transmit Power Control (TPC) may be scrambled by TPC-RNTI. DCI scheduling a UE-specific PDSCH or PUSCH may be scrambled by cell RNTI (C-RNTI).

A DCI format 0_0 may be used as fallback DCI scheduling a PUSCH, and, in this case, CRC may be scrambled by C-RNTI. The DCI format 0_0 of which CRC is scrambled by C-RNTI may include, for example, the following information.

TABLE 3

- Identifier for DCI formats (Identifier for DCI formats) – [1] bit
- Frequency domain resource assignment (Frequency domain resource assignment) - $[\lceil \log_2 (N_{RB}^{UL,BWP} (N_{RB}^{UL,BWP} + 1)/2) \rceil]$ bits
- Time domain resource assignment (Time domain resource assignment) – X bits
- Frequency hopping flag (Frequency hopping flag) – 1 bit.
- Modulation and coding scheme (Modulation and coding scheme) – 5 bits
- New data indicator (New data indicator) – 1 bit
- Redundancy version (Redundancy version) – 2 bits
- HARQ process number (HARQ process number) – 4 bits
- TPC command for scheduled PUSCH (Transmit power control (TPC) command for scheduled PUSCH) – [2] bits
- UL/SUL indicator (Uplink/supplementary UL (UL/SUL) indicator) – 0 or 1 bit A DCI format 0_1 may be used as non-fallback DCI scheduling a PUSCH, and, in this case, CRC may be scrambled by C-RNTI. The DCI format 0_1 of which CRC is scrambled by C-RNTI may include, for example, the following information.

TABLE 4

- Carrier Indicator (Carrier indicator) - 0 or 3 bits
- UL/SUL indicator - 0 or 1 bit
- Identifier for DCI formats - [1] bits
- Bandwidth part indicator (Bandwidth part indicator) - 0, 1 or 2 bits
- Frequency domain resource assignment
    • For resource allocation type 0 (For resource allocation type 0), $\lceil N^{UL,BWP}_{RB}/P \rceil$ bits
    • For resource allocation type 1 (For resource allocation type 1), $\lceil \log_2(N^{UL,BWP}_{RB}(N^{UL,BWP}_{RB} + 1)/2 \rceil$ bits
- Time domain resource assignment - 1, 2, 3, or 4 bits
- VRB-to-PRB mapping (Virtual resource block-to-physical resouce block (VRB-to-PRB) mapping) - 0 or 1 bit, only for resource allocation type 1.
    • 0 bit if only resource allocation type 0 is configured;
    • 1 bit otherwise.

TABLE 4-continued

- Frequency hopping flag - 0 or 1 bit, only for resource allocation type 1.
  • 0 bit if only resource allocation type 0 is configured;
  • 1 bit otherwise.
- Modulation and coding scheme - 5 bits
- New data indicator - 1 bit
- Redundancy version - 2 bits
- HARQ process number - 4 bits
- 1st downlink assignment index (First downlink assignment index) - 1 or 2 bits
  • 1 bit for semi-static HARQ-ACK codebook (For semi-static HARQ-ACK codebook);
  • 2 bits for dynamic HARQ-ACK codebook with single HARQ-ACK codebook (For dynamic HARQ-ACK codebook with single HARQ-ACK codebook).
- 2nd downlink assignment index (First downlink assignment index) - 0 or 2 bits
  • 2 bits for dynamic HARQ-ACK codebook with two HARQ-ACK sub-codebook (For dynamic HARQ-ACK codebook with two HARQ ACK sub-codebook).
  • 0 bit otherwise.
- TPC command for schedule PUSCH - 2 bits

- SRS resource indicator (SRS resource indicator) - $\left\lceil \log_2\left( \sum_{k=1}^{L_{max}} \binom{N_{SRS}}{k} \right) \right\rceil$ or $\lceil \log_2(N_{SRS}) \rceil$ bits

• $\left\lceil \log_2\left( \sum_{k=1}^{L_{max}} \binom{N_{SRS}}{k} \right) \right\rceil$ bits for non-codebook based PUSCH transmission (For non-codebook based PUSCH transmission);
  • $\lceil \log_2(N_{SRS}) \rceil$ bits for codebook based PUSCH transmission (For codebook based PUSCH transmission).
- Precoding information and number of layers (Precoding information and number of layers) - up to 6 bits
- Antenna ports (Antenna ports) - up to 5 bits
- SRS request (SRS request) - 2 bits
- CSI request (Channel state information request) - 0. 1, 2, 3, 4, 5, or 6 bits
- CBG transmission information (Code block group transmission information) - 0, 2, 4, 6, or 8 bits
- PTRS-DMRS association (Phase tracking reference signal-demodulaiton reference signal association) - 0 or 2 bits
- beta_offset indicator (beta_offset indicator) - 0 or 2 bits
- DMRS sequence initialization (Demodulation reference signal sequence initialization) - 0 or 1 bit A DCI format 10 may be used as fallback DCI scheduling a PDSCH, and, in this case, CRC may be scrambled by C-RNTI. The DCI format 1_0 of which CRC is scrambled by C-RNTI may include, for example, the following information.

TABLE 5

- Identifier for DCI formats – [1] bit
- Frequency domain resource assignment –$\lceil \log_2 (N_{RB}^{UL,BWP} (N_{RB}^{UL,BWP} + 1)/2) \rceil$ bits
- Time domain resource assignment – X bits
- VRB-to-PRB mapping – 1 bit.
- Modulation and coding scheme – 5 bits
- New data indicator – 1 bit
- Redundancy version – 2 bits
- HARQ process number – 4 bits
- Downlink assignment index – 2 bits
- TPC command for scheduled PUCCH – [2] bits
- PUCCH resource indicator (Physical uplink control channel (PUCCH) resource indicator) – 3 bits
- PDSCH-to-HARQ feedback timing Indicator (PDSCH-to-HARQ feedback timing indicator)– [3] bits A DCI format 1_1 may be used as non-fallback DCI scheduling a PDSCH, and, in this case, CRC may be scrambled by C-RNTI. The DCI format 1_1 of which CRC is scrambled by C-RNTI may include, for example, the following information.

TABLE 6

- Carrier indicator – 0 or 3 bits
- Identifier for DCI formats – [1] bits
- Bandwidth part indicator – 0, 1 or 2
- Frequency domain resource assignment
  * For resource allocation type 0, $\lceil N_{RB}^{UL,BWP}/P \rceil$ bits
  * For resource allocation type 1, $\lceil \log_2 (N_{RB}^{UL,BWP} (N_{RB}^{UL,BWP} + 1)/2) \rceil$ bits
- Time domain resource assignment –2, 2, 3, or 4 bits
- VRB-to PRB mapping – 0 or 1 bit, only for resource allocation type 1.
  * 0 bit if only resource allocation type 0 is configured;
  * 1 bit otherwise.
- PRB bundling size indicator (Physical resource block bundling size indicator) – 0 or 1 bit
- Rate matching indicator (Rate matching indicator) – 0, 1, or 2 bits
- ZP CSI-RS trigger (Zero power channel state information reference signal (ZP CSI-RS) trigger) – 0, 1, or 2 bits
  For transport block 1(For transport block 1);
  - Modulation and coding scheme – 5 bits
  - New data indicator – 1 bit
  - Redundancy version – 2 bits
  For transport block 2(For transport block 2);
  - Modulation and coding scheme – 5 bits
  - New data indicator – 1 bit
  - Redundancy version – 2 bits
- HARQ process number – 4 bits
- Downlink assignment index – 0 or 2 or 4 bits
- TPC command for scheduled PUCCH – 2 bits
- PUCCH resource indicator – 3 bits
- PDSCH-to-HARQ_feedback timing indicator – 3 bits
- Antenna ports – 4, 8 or 6 bits
- Transmission configuration indication (Transmission configuration indication)– 0 or 3 bits
- SRS request – 2 bits
- CBG transmission information – 0, 2, 4, 6, or 8 bits
- CBG flushing out information (Code block group flushing out information) – 0 or 1 bit
- DMRS sequence initialization – 1 bit Hereinafter, a downlink control channel in a 5G communication system will be described in more detail with reference to the accompanying drawings.

Figure 4:
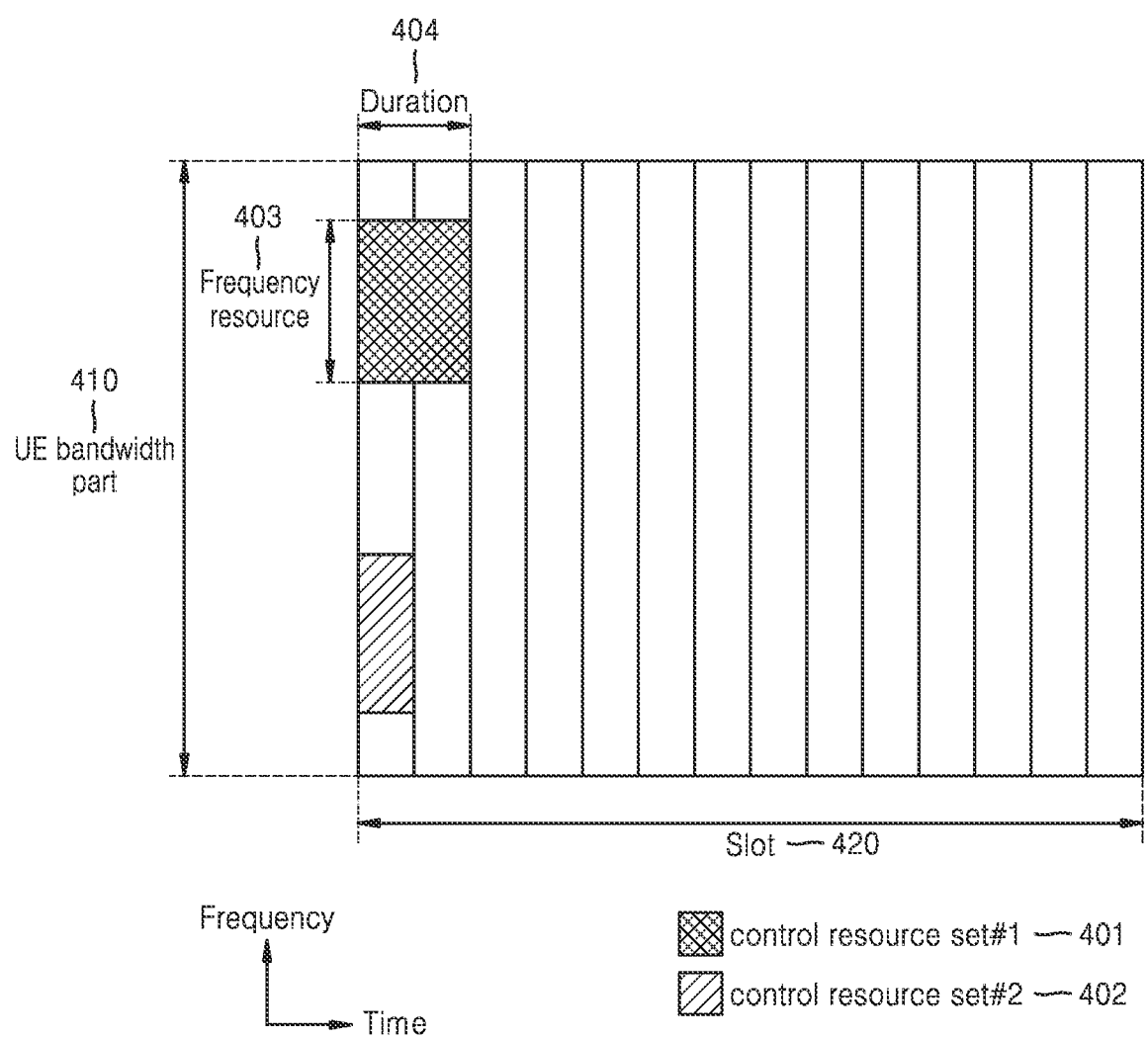
FIG. 4 illustrates an example of a control resource set configuration of a downlink control channel, according to an embodiment of the disclosure.

FIG. 4 illustrates an example of a CORESET in which a downlink control channel is transmitted in a 5G wireless communication system.

In FIG. 4, an example in which a UE bandwidth part 410 is configured on a frequency axis and two control resource sets (control resource set #1 401 and control resource set #2 402) are configured in one slot 420 on a time axis is shown. The control resource set #1 401 and control resource set #2 402 may be configured at a specific frequency resource 403 in the entire UE bandwidth part 410 on the frequency axis. One or plurality of OFDM symbols may be configured on the time axis, and the OFDM symbol(s) may be defined as a Control Resource Set Duration 404. In the example of FIG. 4, the control resource set #1 401 may be configured with a control resource set duration of two symbols, and the control resource set #2 402 may be configured with a control resource set duration of one symbol.

A control resource set in 5G may be configured for a UE by a base station through higher layer signaling (for example, system information (SI), a MIB, or RRC signaling). Configuring a control resource set for a UE means providing information, such as identity of the control resource set, a frequency location of the control resource set, a symbol duration of the control resource set, etc. For example, information used by a base station to configure a control resource set for a UE may include the following information.

TABLE 7

```
ControlResourceSet :=                         SEQUENCE {
       -- Corresponds to L1 parameter 'CORESET-ID'
       controlResourceSetId
       ControlResourceSetId,
   (Control resource set identity)
           frequencyDomainResources           BIT STRING (SIZE
(45)),
       (Frequency domain resource assignment information)
           duration                           INTEGER
(1..maxCoReSetDuration),
       (Time domain resource assignment information)
           cce-REG-MappingType
           CHOICE {
```

TABLE 7-continued

```
(CCE-to-REG mapping type)
       interleaved
    SEQUENCE {
           reg-BundleSize
       ENUMERATED {n2, n3, n6},
    (REG bundle size)
           precoderGranularity
       ENUMERATED {sameAsREG-bundle, allContiguousRBs},
           interleaverSize
       ENUMERATED {n2, n3, n6}
           (Interleaver size)
           shiftIndex
       INTEGER(0..maxNrofPhysicalResourceBlocks-1)
                              OPTIONAL
           (Interleaver shift)
    },
       nonInterleaved                                    NULL
    },
    tci-StatesPDCCH
       SEQUENCE(SIZE(1..maxNrofTCI-StatesPDCCH)) OF TCI-StateId
                       OPTIONAL,
    (QCL configuration information)
       tci-PresentInDCI                          ENUMERATED
{enabled}
           OPTIONAL, -- Need S
}
```

In Table 7, tci-StatesPDCCH (simply, referred to as a TCI state) configuration information may include information of one or plurality of SS/PBCH block indices or Channel State Information Reference Signal (CSI-RS) indices that are Quasi Co-Located (QCL) with a DMRS transmitted in the corresponding control resource set. Hereinafter, TCI may indicate a Transmission Configuration Indication (TCI).

Figure 5:
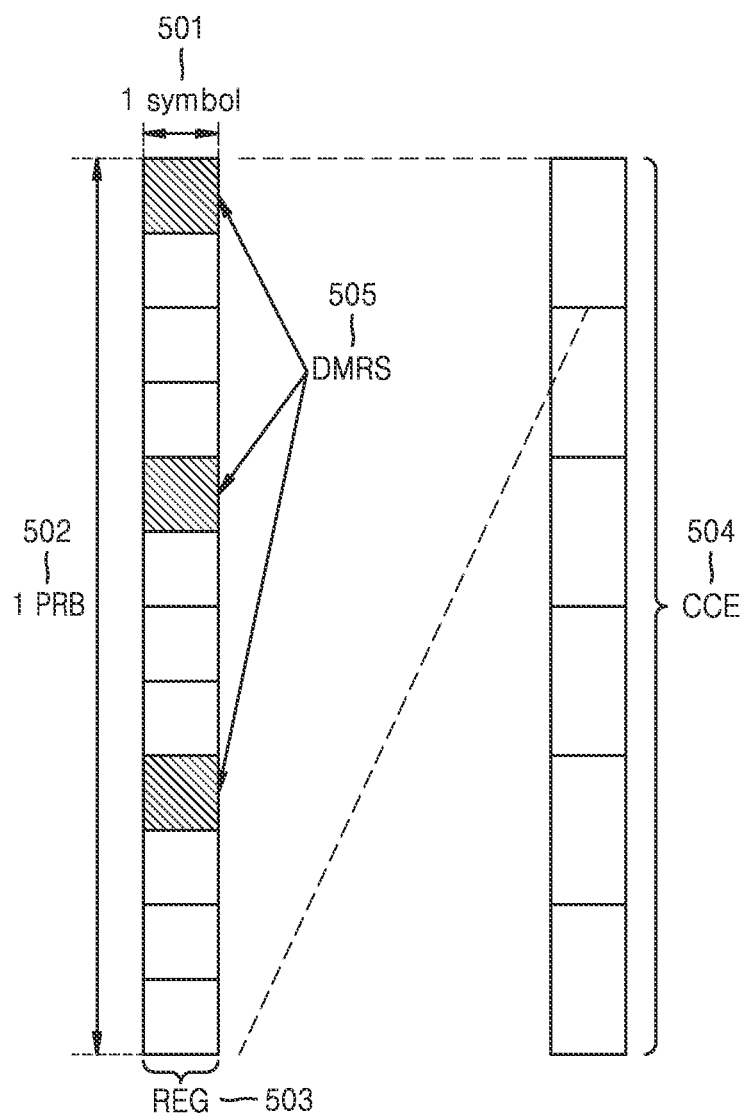
FIG. 5 illustrates a structure of a downlink control channel, according to an embodiment of the disclosure.

FIG. 5 illustrates an example of a basic unit of a time and frequency resource configuring a downlink control channel that is usable in 5G.

As shown in FIG. 5, a basic unit of a time and frequency resource configuring a control channel is referred to as a Resource Element Group (REG) 503. The REG 503 may be defined as one OFDM symbol 501 on a time axis, and one Physical Resource Block (PRB) 502, that is, 12 subcarriers on a frequency axis. A downlink control channel assignment unit may be configured by concatenating REGs 503.

As shown in FIG. 5, when a basic unit to which a downlink control channel is assigned in 5G is a Control Channel Element (CCE) 504, one CCE 504 may be configured with a plurality of REGs 503. When the REG 503 shown in FIG. 5 is described as an example, the REG 503 may be configured with 12 REs. When the CCE 504 is configured with 6 REGs 503, the CCE 504 may be configured with 72 REs. When a downlink control resource set is configured, the corresponding control resource set may be configured with a plurality of CCEs 504, and a specific downlink control channel may be mapped to one or plurality of CCEs 504 according to an Aggregation Level (AL) in the control resource set and transmitted. The CCEs 504 in the control resource set may be distinguished by numbers, and the numbers may be assigned according to a logic mapping method.

The basic unit of the downlink control channel shown in FIG. 5, that is, the REG 503 may include REs to which DCI is mapped and an area to which a DMRS 505 being a reference signal for decoding the REs is mapped. As shown in FIG. 5, three DMRSs 505 may be transmitted in one REG 503.

The number of CCEs required to transmit a PDCCH may be 1, 2, 4, 8, or 16 according to an AL. Different numbers of CCEs may be used to implement link adaptation of a downlink control channel. For example, when AL=L, a downlink control channel may be transmitted through L CCEs.

A UE may detect a signal in the state in which it does not know information about a downlink control channel. For blind decoding of a UE, a search space representing a group of CCEs may be defined. The search space may be a group of downlink control channel candidates consisting of CCEs that the UE needs to attempt to decode on a given aggregation level. Because there are various aggregation levels forming one bundle with 1, 2, 4, 8, or 16 CCEs, the UE may have a plurality of search spaces. A search space set may be defined as a group of search spaces in all configured aggregation levels.

Search spaces may be classified into a common search space and a UE-specific search space. UEs of a preset group or all UEs may monitor a common search space of a PDCCH for dynamic scheduling for system information or receiving cell common control information such as a paging message. For example, a UE may monitor a common search space of a PDCCH to receive PDSCH scheduling assignment information for transmitting a SIB including cell operator information, etc. In the case of the common search space, UEs of a preset group or all UEs need to receive a PDCCH. Therefore, the common search space may be defined as a group of pre-promised CCEs. A UE may monitor a UE-specific search space of a PDCCH to receive scheduling assignment information for a UE-specific PDSCH or PUSCH. The UE-specific search space may be a function of UE identity and arious system parameters, and may be U-specifically defined.

In 5G, a parameter for a search space for a PDCCH may be configured for a UE by a base station through higher layer signaling (for example, SIB, MTB, or RRC signaling). For example, the base station may configure, for the UE, the number of PDCCH candidates, a monitoring cycle for a search space, a monitoring occasion of a symbol unit in a slot forthe search space, a search space type (a common search space or a Ur-specific search space), a combination of a DCI format and RNTI to be monitored inthe corresponding search space, acontrol resource set index formonitoring the search space, etc., in each aggregation level L. For example, information configured for the UE by the base station may include the following information.

TABLE 8

```
SearchSpace ::=                                    SEQUENCE {
    -- Identity of the search space. SearchSpaceId = 0 identifies the SearchSpace
configured via PBCH (MIB) or ServingCellConfigCommon.
        searchSpaceId
        SearchSpaceId,
    (Search space identifier)
        controlResourceSetId
        ControlResourceSetId,
    (Control resource set identifier)
        monitoringSlotPeriodicityAndOffset       CHOICE {
    (Monitoring slot level period)
            sl1
        NULL,
            sl2
        INTEGER (0..1),
            sl4
        INTEGER (0..3),
            sl5
        INTEGER (0..4),
            sl8
        INTEGER (0..7),
            sl10
        INTEGER (0..9),
            sl16
        INTEGER (0..15),
            sl20
        INTEGER (0..19)
        }
                                                 OPTIONAL,
        monitoringSymbolsWithinSlot              BIT STRING
(SIZE (14))
                                                 OPTIONAL,
    (Monitoring symbols within slot)
        nrofCandidates                           SEQUENCE {
    (Number of PDCCH candidates for each aggregation level)
            aggregationLevel1
        ENUMERATED {n0, n1, n2, n3, n4, n5, n6, n8},
            aggregationLevel2
        ENUMERATED {n0, n1, n2, n3, n4, n5, n6, n8},
            aggregationLevel4
        ENUMERATED {n0, n1, n2, n3, n4, n5, n6, n8},
            aggregationLevel8
        ENUMERATED {n0, n1, n2, n3, n4, n5, n6, n8},
            aggregationLevel16
        ENUMERATED {n0, n1, n2, n3, n4, n5, n6, n8}
        },
        searchSpaceType                          CHOICE {
    (Search space type)
            -- Configures this search space as common search space (CSS) and
DCI formats to monitor.
            common
        SEQUENCE {
        (Common search space)
        }
            ue-Specific
        SEQUENCE {
        (UE-specific search space)
                -- Indicates whether the UE monitors in this USS for DCI
formats 0-0 and 1-0 or for formats 0-1 and 1-1.
            formats
        ENUMERATED { formats0-0-And-1-0, formats0-1-And-1-1},
            ...
        }
```

The base station may configure one or plurality of search space sets for the UE according to the above-described configuration information. For example, the base station may configure a search space set 1 and a search space set 2 for the UE, to monitor, in the search space set 1, DCI format A scrambled by X-RNTI in a common search space, and monitor, in the search space set 2, DCI format B scrambled by Y-RNTI in a UE-specific search space.

According to the above-described configuration information, one or plurality of search space sets may exist in the common search space or the UE-specific search space. For example, search space set #1 and search space set #2 may be configured as a common search space, and search space set #3 and search space set #4 may be configured as a UE-specific search space.

In the common search space, combinations of DCI formats and RNTIs as follows may be monitored.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, combinations of DCI formats and RNTIs as follows may be monitored.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The stated RNTIs may have definitions and uses as follows.

C-RNTI (Cell RNTI): use for scheduling UE-specific PDSCH

TC-RNTI (Temporary Cell RNTI): use for scheduling UE-specific PDSCH

CS-RNTI(Configured Scheduling RNTI): use for scheduling quasi-statically configured UE-specific PDSCH RA-RNTI (Random Access RNTI): use for scheduling PDSCH in a random access operation P-RNTI (Paging RNTI): use for scheduling PDSCH in which paging is transmitted SI-RNTI (System Information RNTI): use for scheduling PDSCH in which system information is transmitted INT-RNTI (Interruption RNTI): use for informing pucturing for PDSCH TPC-PUSCH-RNTI (Transmit Power Control for PUSCH RNTI): use for power control command indication for PUSCH TPC-PUCCH-RNTI (Transmit Power Control for PUCCH RNTI): use for power control command indication for PUCCH TPC-SRS-RNTI (Transmit Power Control for SRS RNTI): use for power control command indication for SRS The stated DCI formats may have definitions as follows.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, because a plurality of search space sets can be configured with different parameters (for example, parameters of Table 8), a group of search space sets that a UE monitors in a preset occasion may change. For example, when the search space set #1 is set to a X-slot period, the search space set #2 is set to a Y-slot period, and X is different from Y, the UE may monitor both the search space set #1 and the search space set #2 in a specific slot, and monitor one of the search space set #1 and the search space set #2 in another specific slot.

When a plurality of search space sets are set for the UE, the following conditions may be considered in a method of determining a search space set that the UE attempts to monitor.

Condition 1: Limit of the Maximum Number of PDCCH Candidates

The number of PDCCH candidates that can be monitored for each slot does not exceed $M^\mu$. $M^\mu$ may be defined as the maximum number of PDCCH candidates per slot in a cell configured with a subcarrier spacing of $15 \cdot 2^\mu$ kHz, and may be defined as the following Table.

TABLE 10

| μ | Maximum number of PDCCH candidates per slot and per serving cell ($M^\mu$) |
| --- | --- |
| 0 | 44 |
| 1 | 36 |
| 2 | 22 |
| 3 | 20 |

Condition 2: Limit of the Maximum Number of CCEs

The number of CCEs configuring an entire search space (herein, the entire search space means a group of entire CCEs corresponding to a union area of a plurality of search space sets) per slot may not exceed $C^\mu$. $C^\mu$ may be defined as the maximum number of CCEs per slot in a cell configured with a subcarrier spacing of $15 \cdot 2^\mu$ kHz, and may be defined as the following Table.

TABLE 11

| μ | Maximum number of CCEs per slot and per serving cell ($C^\mu$) |
| --- | --- |
| 0 | 56 |
| 1 | 56 |
| 2 | 48 |
| 3 | 32 |

For convenience of description, a situation satisfying both the above-described conditions 1 and 2 in a specific occasion may be defined as "condition A". Accordingly, not satisfying the condition A may mean not satisfying at least one condition of the above-described conditions 1 and 2.

A case in which the condition A is not satisfied in a specific occasion may occur according to a configuration of search space sets of the base station. In the case in which the condition A is not satisfied in the specific occasion, the UE may select and monitor some of search space sets configured to satisfy the condition A in the corresponding occasion, and the base station may transmit a PDCCH to the selected search space set(s).

A method of selecting some search spaces from among entire configured search space sets may be the following method.

[Method 1]

When the condition A for a PDCCH is not satisfied in a specific occasion (slot), the UE or base station may select a search space set of which a search space type is set to a common search space from among search space sets existing in the corresponding occasion, more preferentially than a search space set of which a search space type is set to a UE-specific search space.

When all search space sets set to the common search space have been selected (that is, when the condition A is satisfied even after all the search spaces set to the common search space are selected), the UE or base station may select search space sets set to a UE-specific search space. When there are a plurality of search space sets set to the UE-specific search space, a search space set with a lower search space set index may have a higher priority. The UE or base station may select UE-specific search space sets in a range of satisfying the condition A, in consideration of priorities.

Hereinafter, a method of determining a limit of the maximum number of PDCCH candidates and a limit of the maximum number of CCEs in an environment operating with carrier aggregation (CA) in 5G will be described in detail.

When a UE can perform carrier aggregation on 4 or more cells (or, referred to as component carriers (CCs)), the UE may report capability for the number $N^{cap}$ of downlink cells capable of monitoring PDCCH candidates to a base station. When the UE receives a configuration of a total of $N\mu$ cells of which a subcarrier spacing is set to from the base station and the configured cells correspond to cells operating by self-scheduling, the UE may consider a limit $M^{total,\mu}$ of the number of PDCCH candidates and a limit $C^{total,\mu}$ of the number of CCEs for the N cells, according to the following Equations 1 and 2. Herein, the self-scheduling may mean an operation in which transmission/reception of control information indicating scheduling for a data channel and the data channel scheduled by the corresponding control information is performed in the same cell.

$$M^{total,\mu}=\min\{N^\mu \cdot M^\mu, \lfloor N^{cap} \cdot M^\mu \cdot N^\mu / N^{total} \rfloor\} \quad \text{Equation 1}$$

$$C^{total,\mu}=\min\{N^\mu \cdot C^\mu, \lfloor N^{cap} \cdot C^\mu \cdot N^\mu / N^{total} \rfloor\} \quad \text{Equation 2}$$

$$N^{total}=N^0+N^1+N^2+N^3 \quad \text{Equation 1 and 2}$$

In this case, $M^{total,\mu}$ and $C^{total,\mu}$ of Equations 1 and 2 are referred, for convenience of description, to as a "first limit". That is, the first limit may mean limits of the maximum number of PDCCH candidates and the maximum number of CCEs that may be applied to one or plurality of cells configured with a subcarrier spacing $\mu$. The UE may receive a configuration of a search space set from the base station. The search space set may be expected to not exceed the first limit. That is, the IE may be expected to monitor search spaces configured with the maximum number $M^{total,\mu}$ of PDCCH candidates and the maximum number $C^{total,\mu}$ of CCEs. The base station may configure, for the UE, search space sets configured for cells configured with a subcarrier spacing such that the search space sets do not exceed the first limit. That is, the base station may configure, for the UE, search space sets configured for cells configured with a subcarrier spacing such that a total number of PDCCH candidates configuring the search space sets does not exceed $M^{total,\mu}$ and a total number of CCEs configuring the search space sets does not exceed $C^{total,\mu}$.

$M^\mu$ of Table 10 and $C^\mu$ of Table 11 may be referred, for convenience of description, to as a "second limit". That is, the second limit may mean limits of a maximum number of PDCCH candidates and a maximum number of CCEs that can be applied to a specific cell configured with a subcarrier spacing $\mu$. The base station may notify, when configuring a search space set for a specific cell for the UE, the UE of a search space configuration (that is, when the above-described condition A is not satisfied) exceeding the second limit in a specific occasion. The UE may exceed the second limit, when monitoring the search space of the specific cell in the specific occasion, according to the search space configuration of the base station. In this case, the UE may selectively monitor a specific search space set according to a procedure of [Method 1] described above.

The base station may configure a search space set such that a secondary cell does not always exceed the second limit. The UE may expect a search space set configuration in which the secondary cell does not always exceed the second limit.

When the UE can perform carrier aggregation on 4 or more cells (or, referred to as component carriers (CCs)), the UE may report capability for the number $N^{cap}$ of downlink cells capable of monitoring PDCCH candidates to the base station. When the UE receives a configuration of a total of N cells of which subcarrier spacing is set to from the base station, cross-scheduling is performed on the N cells, and the cells on which cross-scheduling is performed correspond to cells of which a subcarrier spacing is set to $\mu$, the UE may consider a limit $M^{total,\mu}$ of the number of PDCCH candidates and a limit $C^{total,\mu}$ of the number of CCEs with respect to the $N^\mu$ cells, according to the following Equations 3 and 4. Herein, the cross-scheduling may be defined as an operation in which a cell transmitting control information indicating scheduling for a data channel is different from a cell transmitting and receiving the data channel scheduled by the corresponding control information.

$$M^{total,\mu}=\min(N^\mu, N^{cap}) \cdot M^\mu \quad \text{Equation 3}$$

$$C^{total,\mu}=\min(N^\mu, N^{cap}) \cdot C^\mu \quad \text{Equation 4}$$

Figure 6:
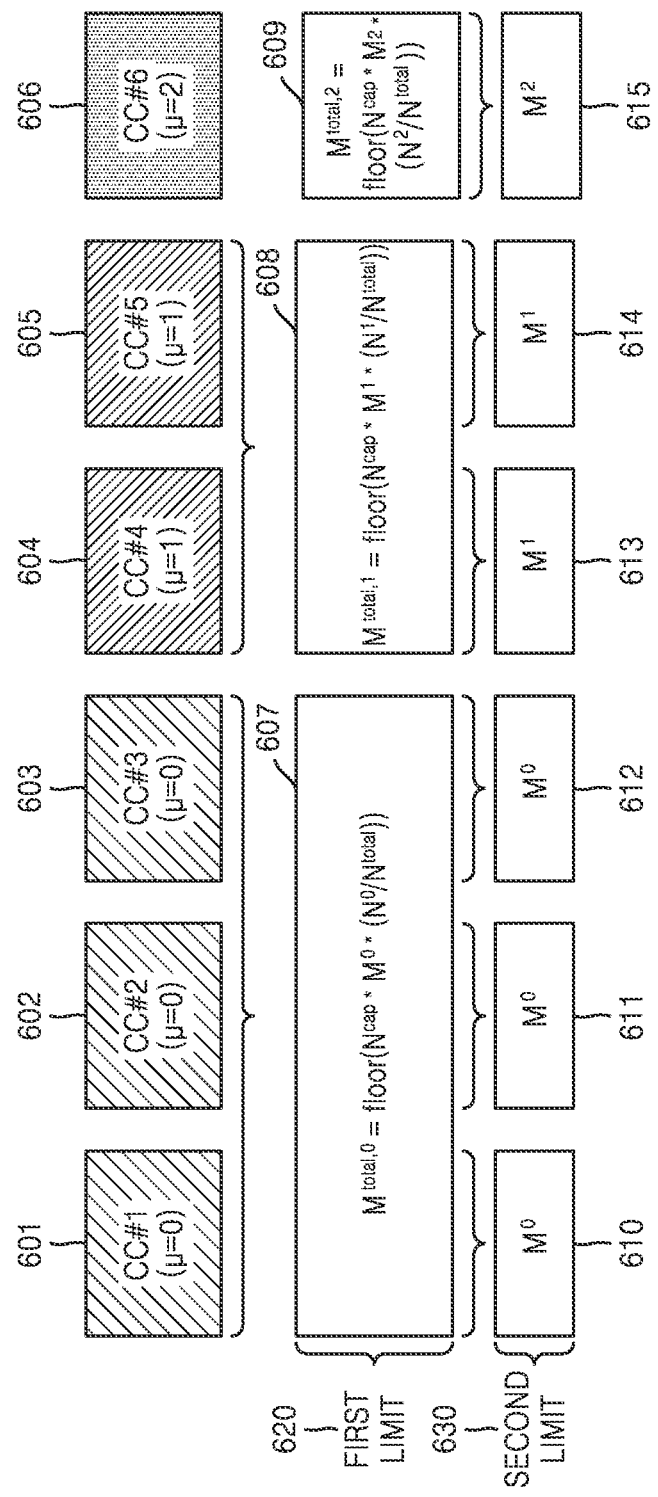
FIG. 6 illustrates an example of a method of determining limits of the maximum numbers of physical downlink control channel (PDCCH) candidates, according to an embodiment of the disclosure.

FIG. 6 illustrates an example of applying the limits of the maximum number of PDCCH candidates and the maximum number of CCEs, in a carrier aggregation environment.

In an embodiment of the disclosure that is described with reference to FIG. 6, self-scheduling is considered. In an embodiment of the disclosure, for convenience of description, it is assumed that a total of 6 cells CC #1 601, CC #2 602, CC #3 603, CC #4 604, CC #5 605, and CC #6 606 are configured.

CC #1 601, CC #2 602, and CC #3 603 may be configured with a subcarrier spacing of $\mu=0$ (that is, corresponding to 15 kHz), CC #4 604 and CC #5 605 may be configured with a subcarrier spacing of $\mu=1$ (that is, corresponding to 30 kHz), and CC #6 606 may be configured with a subcarrier spacing of $\mu=2$ (that is, corresponding to 60 kHz).

Accordingly, in the example of FIG. 6, $M^0=3$, $N^1=2$, $N^2=1$, and $N^{total}=6$. A UE may report capability for the number of downlink cells capable of monitoring PDCCH candidates to a base station. In the example of FIG. 6, it is assumed that $N^{cap}=4$.

A first limit for the number of PDCCH candidates with respect to the cells CC #1 601, CC #2 602, and CC #3 603 corresponding to =0 may be calculated as follows.

$$M^{total,0}=\min\{N^0 \cdot M^0, \lfloor N^{cap} \cdot M^0 \cdot N^0 / N^{total} \rfloor\} = \lfloor N^{cap} \cdot M^0 \cdot N^0 / N^{total} \rfloor = 88$$

A first limit for the number of PDCCH candidates with respect to the cells CC #4 604 and CC #5 605 corresponding to =1 may be calculated as follows.

$$M^{total,1}=\min\{N^1 \cdot M^1, \lfloor N^{cap} \cdot M^1 \cdot N^1 / N^{total} \rfloor\} = \lfloor N^{cap} \cdot M^1 \cdot N^1 / N^{total} \rfloor = 48$$

A first limit for the number of PDCCH candidates with respect to the cell CC #6 606 corresponding to =2 may be calculated as follows.

$$M^{total,2}=\min\{N^2 \cdot M^2, \lfloor N^{cap} \cdot M^2 \cdot N^2 / N^{total} \rfloor\} = \lfloor N^{cap} \cdot M^2 \cdot N^2 / N^{total} \rfloor = 14$$

A second limit for the number of PDCCH candidates with respect to the cells CC #1 601, CC #2 602, and CC #3 603 corresponding to $\mu=0$ may be determined as $M^0=44$, a second limit for the number of PDCCH candidates with respect to the cells CC #4 604 and CC #5 605 corresponding to =1 may be determined as $M^1=36$, and a second limit for the number of PDCCH candidates with respect to the cell CC #6 606 corresponding to =2 may be determined as $M^2=22$ (see Table 10).

According to an embodiment of the disclosure, a limit for the number of PDCCH candidates has been described as an example, however, a limit $C^{total,\mu}$ for the number of CCEs may also be calculated by the same method.

According to an embodiment of the disclosure, the base station may configure and indicate a TCI state for a PDCCH (or PDCCH DMRS) through appropriate signaling. A TCI state may be aimed to notify a QCL relationship between a PDCCH (PDCCH DMRS) and another RS or channel. That a certain reference antenna port A (RS #A) is QCLed with another target antenna port B (target RS #B) means that applying the entire or a part of large-scale channel parameters estimated from the antenna port A to channel estimation from the antenna port B is allowed by a UE.

QCL may need to be related to different parameters, according to situations: 1) time tracking influenced by average delay and delay spread, 2) frequency tracking influenced by Doppler shift and Doppler spread, 3) radio resource management (RRM) influenced by an average gain, and 4) beam management (BM) influenced by a spatial parameter. Accordingly, NR may support four types of QCL relationships as shown in Table 12 below.

TABLE 12

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

A spatial RX parameter is a generic term for the entire or a part of various parameters, such as Angle of Arrival (AoA), Power Angular Spectrum (PAS) of AoA, Angle of Departure (AoD), PAS of AoD, transmit/receive channel correlation, transmit/receive beamforming, and spatial channel correlation.

A QCL relationship may be configured for a UE through RRC parameter TCq-State and QCL-nfo, as shown in Table 13 below. Referring to Table 13, a base station may configure at least one TCI state for a UE to notify a maximum of two QCL relationships (qcl-Typeio and qcl-Type2) for a RS (that is, a target RS) referring to an ID of the TCI state. QCL information QCL-Info included in each TCL state may include a serving cell index and a bandwidth part (BWP) of a reference RS that is indicated by the corresponding QCL information, atype and ID of the reference RS, and a QCL type as shown in Table 12.

TABLE 13

```
TCI-State ::=                                        SEQUENCE {
    tci-StateId                                      TCI-StateId,
    (ID of corresponding TCI state)
    qcl-Type1                                        QCL-Info,
    (QCL information of first reference RS of RSs (target RSs) referring to
corresponding TCI state ID)
    qcl-Type2                                        QCL-Info
                     OPTIONAL, -- Need R
    (QCL information of second reference RS of RSs (target RSs) referring to
corresponding TCI state ID)
    ...
}
QCL-Info ::=                                         SEQUENCE {
    cell                                             ServCellIndex
                     OPTIONAL, -- Need R
    (Serving cell index of reference RS indicated by corresponding QCL
information)
    bwp-Id                                           BWP-Id
                     OPTIONAL, -- Cond CSI-RS-Indicated
    (BWP index of reference RS indicated by corresponding QCL information)
    referenceSignal                                  CHOICE {
        csi-rs                                       NZP-CSI-RS-
ResourceId,
        ssb                                          SSB-
Index
    (One of CSI-RS ID or SSB ID indicated by corresponding QCL information)
    },
    qcl-Type                                         ENUMERATED
{typeA, typeB, typeC, typeD},
    ...
}
```

Figure 7:
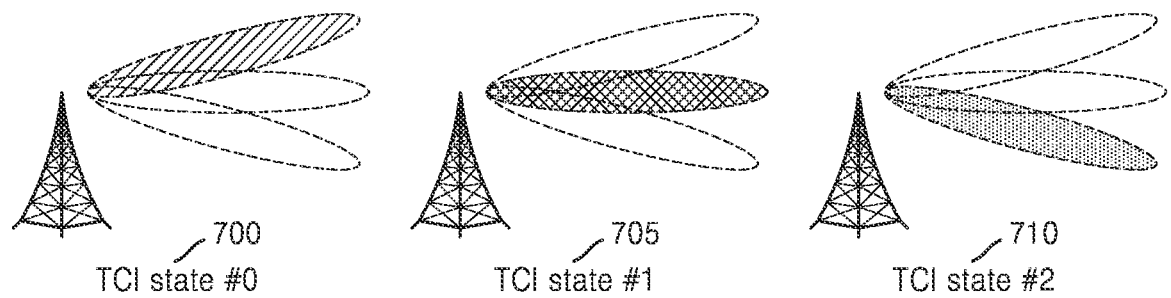
FIG. 7 illustrates an example of changing a beam of a channel according to transmission configuration indication (TCI) state indications, according to an embodiment of the disclosure.

FIG. 7 illustrates an example of beam assignment by a base station according to a TCI state configuration.

Referring to FIG. 7, a base station may transfer information about different N beams to a UE through different N TCI states.

For example, as shown in FIG. 7, in the case of N=3, the base station may relate qcl-Type2 parameters included in three TCI states 700, 705, and 710 to CSI-RS or SSB (SS/PBCH Block) corresponding to different beams and set the qcl-Type2 parameters to QCL-type-D. Thereby, the base station may notify that antenna ports referring to the different TCI states 700, 705, and 710 are related to different spatial Rx parameters, that is, different beams. More particularly, combinations of TCI states, which are applicable to a PDCCH DMRS antenna port, are shown in Table 14 below. In Table 14, a fourth row may be a combination assumed by a UE before RRC configuration, although not limited thereto.

TABLE 14

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
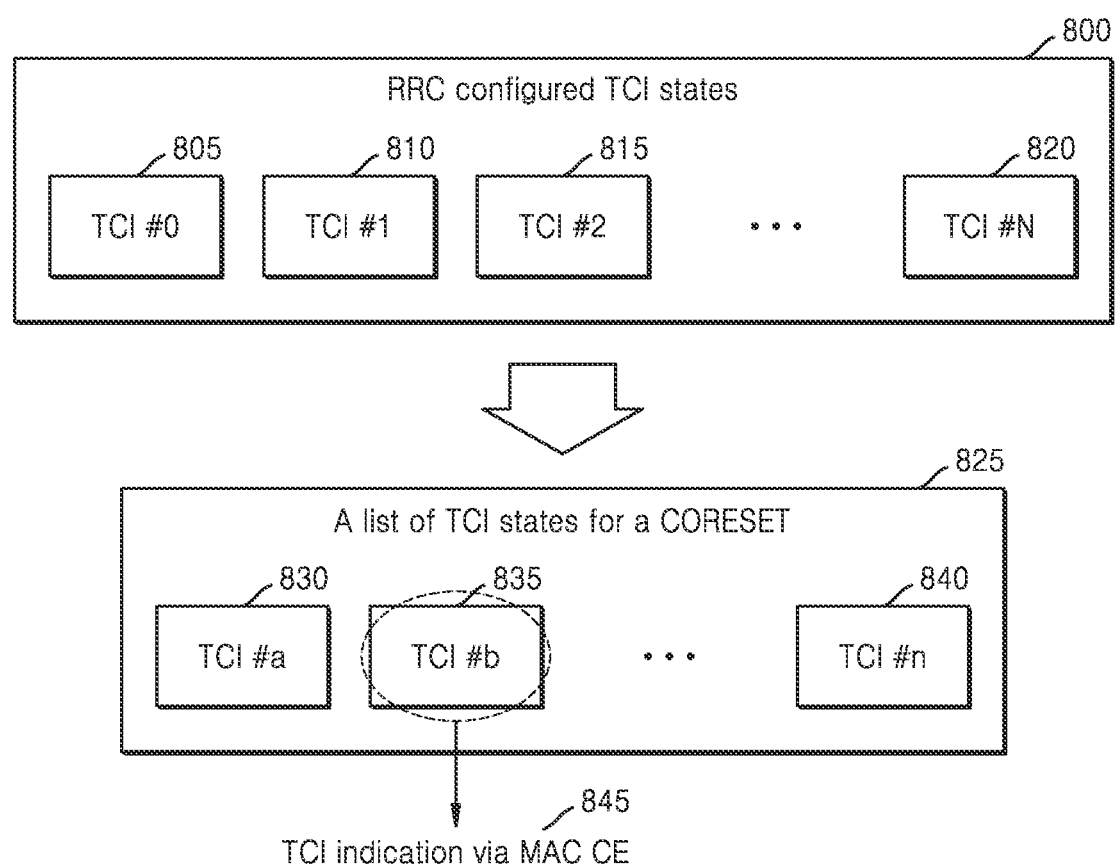
FIG. 8 illustrates an example of TCI state signaling for PDCCH beam configuration and indication, according to an embodiment of the disclosure.

FIG. 8 illustrates an example of TCI state signaling for PDCCH beam configuration and indication.

NR may support a hierarchical signaling method shown in FIG. 8 for dynamic assignment for a PDCCH beam.

Referring to FIG. 8, a base station may configure N TCI states 805, 810, . . . , 820 for a UE through RRC signaling (800), and configure some of the TCI states 805, 810, . . . , 820 as TCI states for a CORESET (825).

Thereafter, the base station may indicate a TCI state of the TCI states 830, 835, and 840 for the CORESET to the UE through Medium Access Control Control Element (MAC CE) signaling (845).

Then, the UE may receive a PDCCH based on the TCI state indicated by the MAC CE signaling and including beam information.

Figure 9:
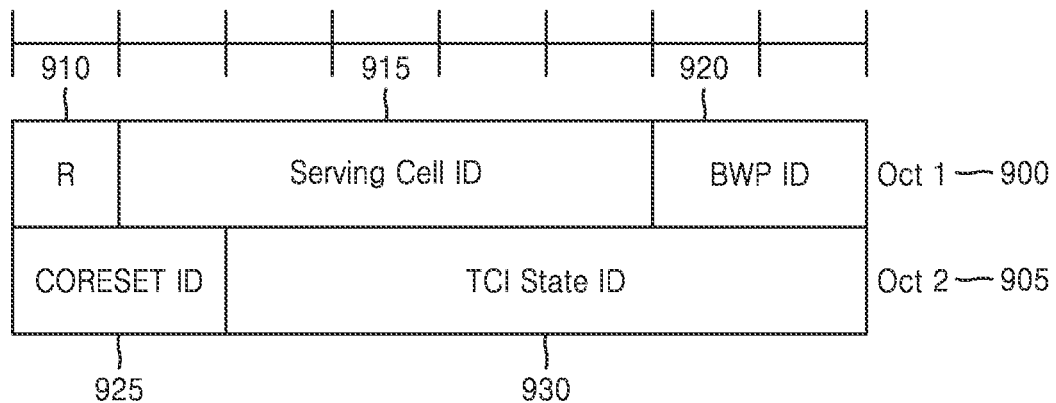
FIG. 9 illustrates an example of a medium access control control element (MAC CE) signaling structure for PDCCH beam indication, according to an embodiment of the disclosure.

FIG. 9 illustrates a TCI indication MAC CE signaling structure for a PDCCH DMRS.

Referring to FIG. 9, TCI indication MAC CE signaling for a PDCCH DMRS may be configured with 2 bytes (16 bits) 900 and 905. The TCI indication MAC CE signaling 900 and 905 may include a reserved bit 910 of 1 bit, a serving cell ID 915 of 5 bits, a BWP ID 920 of 2 bits, a CORESET ID 925 of 2 bits, and a TCI state ID 930 of 6 bits. However, the numbers of bits of the above-mentioned components are only examples and not limited thereto.

Figure 10:
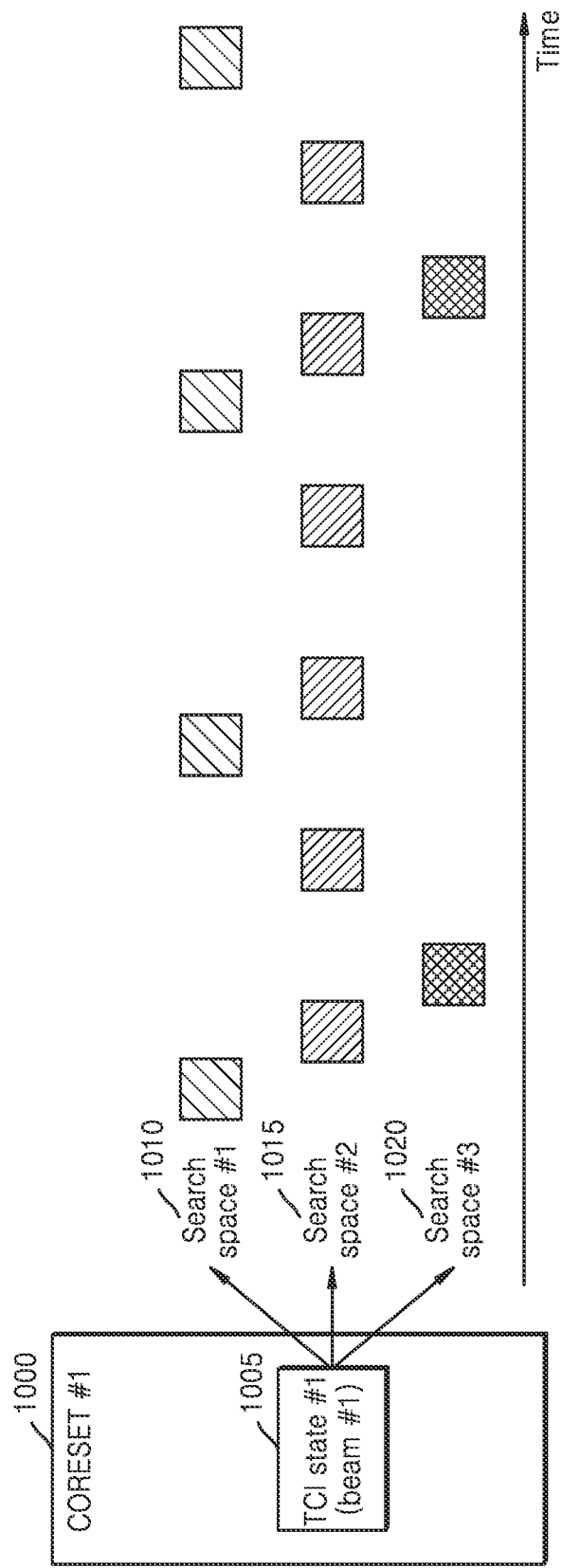
FIG. 10 illustrates beam relationships between search spaces and a control resource set (CORESET) in NR phase 1, according to an embodiment of the disclosure.

FIG. 10 illustrates an example of a beam configuration for a CORESET and search spaces, according to an embodiment of the disclosure.

Referring to FIG. 10, a base station may indicate a TCI state of a TCI state list included in configuration of a CORESET 1000 through MAC CE signaling (1005).

Then, a UE may consider that the same QCL information (beam #1) 1005 is applied to one or more search spaces 1010, 1015, and 1020 connected to the CORESET, until another TCI state is indicated for the corresponding CORESET through another MAC CE signaling.

According to an embodiment of the disclosure, a PDCCH beam assignment method described above may be more or less limited in view of flexible PDCCH beam operating, because it may not indicate a faster beam change than a MAC CE signaling delay or it may apply the same beam to CORESETs regardless of characteristics of search spaces.

Hereinafter, embodiments of the disclosure provide a more flexible PDCCH beam configuration and operating method.

According to an embodiment of the disclosure, NR may apply a multi-panel structure to antennas of a base station and a UE to use analog beams or perform multi-point transmission, and, in this case, a plurality of pieces of beam information may need to be configured for a downlink control channel.

According to an embodiment of the disclosure, in the case of NR phase 1 standard, one beam per occasion of a control channel may be configured through MAC CE signaling, and an operation of dynamically changing a beam of a control channel according to various situations or an operation of simultaneously transmitting and receiving control channels based on multiple beams may be needed.

According to an embodiment of the disclosure, a dynamic beam changing method for a control channel and methods for control channel transmission/reception based on multiple beams may be provided.

First Embodiment

According to an embodiment of the disclosure, a method of indicating a plurality of TCI states (QCL or beam information) per CORESET to assign different TCI states (QCL or beam information) to different search spaces connected to a CORESET is disclosed.

Figure 11:
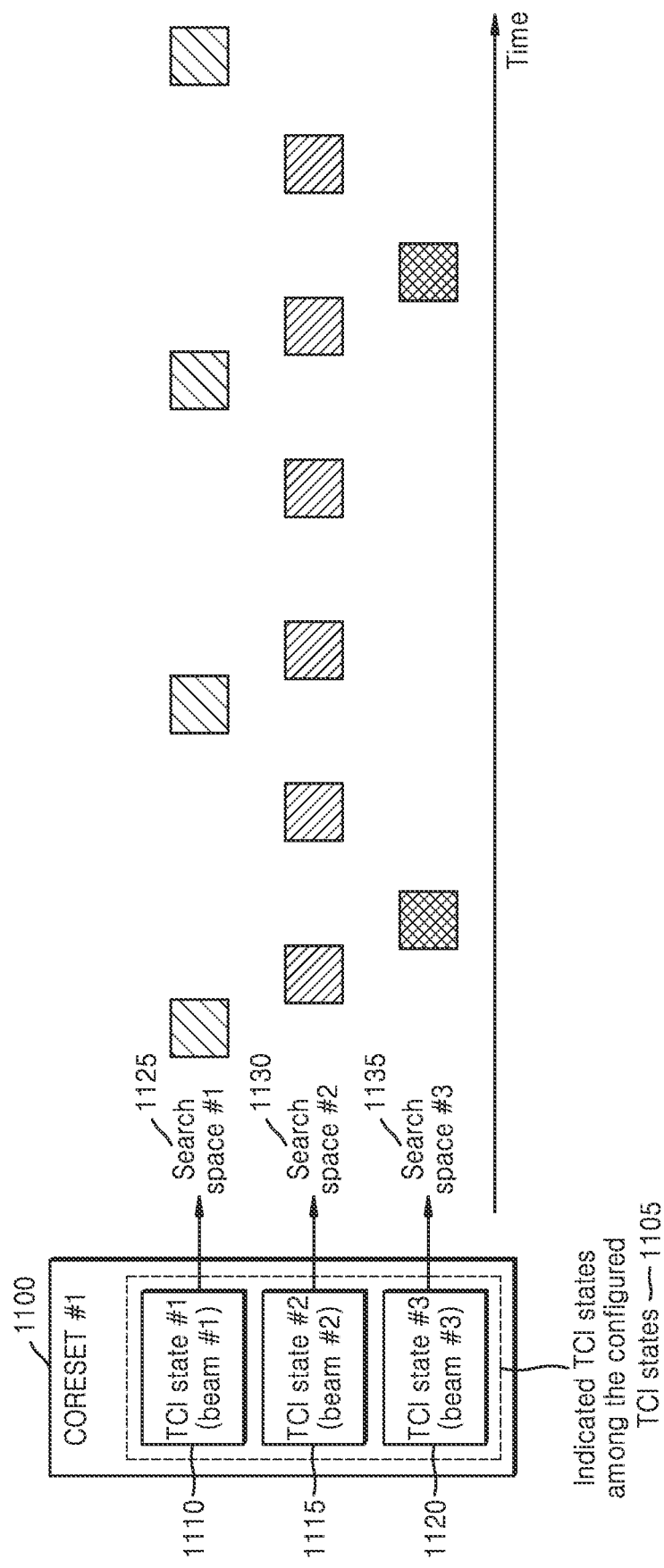
FIG. 11 illustrates a first embodiment of the disclosure.

FIG. 11 illustrates an operation example of a first embodiment.

Referring to FIG. 11, a base station may indicate a plurality of TCI states for a CORESET 1100 by using one of the following methods (1105):

Method 1: MAC CE signaling may indicate one or more TCI state IDs from among a TCI state list included in a CORESET configuration. When a UE receives PDCCH TCI indication MAC CE signaling #A and PDCCH TCI indication MAC CE signaling #B in different occasions (in different slots or in different PDSCHs), the UE may update a PDCCH TCI state in the order received. Meanwhile, when the UE receives the signaling #A and the signaling #B simultaneously (in the same slot or in the same PDSCH), the UE may consider all TCI states respectively indicated by the individual signalings #A and #B. In the current example, two different MAC CE signalings are assumed, however, expansion to three MAC CE signalings or more may also be possible in the similar way.

Method 2: MAC CE signaling may indicate one or more TCI state IDs from among a TCI state ID list included in a CORESET configuration. According to an embodiment of the disclosure, MAC CE signaling of FIG. 9 may expand to a structure of 3 bytes or more to be improved to indicate one or more TCI state IDs at once.

Method 3: when a reserved bit 910 of MAC CE signaling of FIG. 9 is 0 (or 1), final 6 bits 930 of the corresponding MAC CE signaling may mean a TCI state ID, like they usually do. When the reserved bit 910 is 1 (or 0), the final 6 bits 930 of the corresponding MAC CE signaling may change to indicate a group of a TCI state ID.

According to an embodiment of the disclosure, the UE may use the TCI state ID 930 as it is or understand that all TCI states included in a TCI state ID list configured in the CORESET signaling have been indicated, according to the first bit value 910 of the MAC CE signaling. According to another example, the UE may use the TCI state ID 930 as it is or understand that one of TCI state group IDs additionally configured in the CORESET signaling has been indicated, according to the first bit value 910 of the MAC CE signaling.

The following indicated one or more TCI states may be respectively assigned to search spaces according to a preset rule. For example, as shown in FIG. 11, 1110 may be assigned to 1125, 1115 may be assigned to 1130, and 1120 may be assigned to 1135. Hereinafter, for convenience of description, the preset rule is referred to as a 'TCI state assignment rule'.

According to an embodiment of the disclosure, the 'TCI state assignment rule' may assign one or more TCI states to the respective search spaces, (1) in an ascending (descending) order of search space IDs, (2) in an ascending (descending) order of monitoring slot level periods (in an ascending (descending) order of slot offsets in the case of the same period), (3) according to timings of monitoring symbols in slots, (4) in an ascending (descending) order of the numbers of monitoring symbols in slots, (5) in an descending (ascending) order of maximum aggregation levels, (6) in a descending (ascending) order with respect to a maximum value of the number of PDCCH candidates (the number of CCEs) for each aggregation level, (7) in a descending (ascending) order with respect to a total number of PDCCH candidates (the number of CCEs) for each aggregation level, or (8) according to an assignment rule through extra RRC signaling.

According to the method (1), simple base station implementation based on search space IDs may be possible.

According to the methods (2) to (4), an important or urgent PDCCH may be assigned to a search space of a short period.

According to the method (5), a PDCCH having a high aggregation level, that is, high reliability may be preferentially received.

According to the methods (6) and (7), importance may be implicitly determined according to a set number of blind decoding.

After one or more TCI states for a CORESET are indicated and a TCI state is assigned to each search space, search spaces being assigned two or more different TCI states may overlap in a specific monitoring occasion. In this case, the UE may apply a priority rule to attempt to detect a PDCCH in a search space having a highest priority. Hereinafter, for convenience of description, this is referred to as a 'priority rule'.

According to an embodiment of the disclosure, the 'priority rule' may be configured such that priorities of search spaces are determined, (1) in an ascending (descending) order of search space IDs, (2) in an ascending (descending) order of monitoring slot level periods (in an ascending (descending) order of slot offsets in the case of the same period), (3) according to timings of monitoring symbols in slots, (4) in an ascending (descending) order of the numbers of monitoring symbols in slots, (5) in an descending (ascending) order of maximum aggregation levels, (6) in a descending (ascending) order with respect to a maximum value of the number of PDCCH candidates (the number of CCEs) for each aggregation level, or (7) in a descending (ascending) order with respect to a total number of PDCCH candidates (the number of CCEs) for each aggregation level.

According to the method (1), simple base station implementation based on search space IDs may be possible.

According to the methods (2) to (4), an important or urgent PDCCH may be assigned to a search space of a short period.

According to the method (5), a PDCCH having a high aggregation level, that is, high reliability may be preferentially received.

According to the methods (6) and (7), importance may be implicitly determined according to a set number of blind decoding.

A beam assignment order determining method for each possible search space and priority determining methods for overlapping search spaces, as described above, may be configured through some combinations upon actual applications.

According to an embodiment of the disclosure, a base station and a UE may sequentially assign TCI states indicated to the corresponding CORESET in an ascending order of search space IDs. When two or more search space monitoring occasions to which different TCI states are assigned overlap, the base station and the UE may promise to attempt to preferentially detect a search space having a shortest (or longest) monitoring cycle. This may be aimed to assign a more urgent and important PDCCH to a search space having a short monitoring cycle, and the reason may be because one time missing a monitoring occasion of a search space having a long monitoring cycle is a great load.

According to an embodiment of the disclosure, the base station and the UE may sequentially assign TCI states indicated to the corresponding CORESET in an ascending order of monitoring cycles of search spaces. When two or more search space monitoring occasions to which different TCI states are assigned overlap, the base station and the UE may promise to attempt to preferentially detect a search space having a greatest (or smallest) aggregation level. This may be aimed to facilitate assigning a more important PDCCH to a search space having a great aggregation level. For reference, this may be an operation under an assumption that a search space having a small aggregation level will be mainly used for a multi-beam operation.

According to an embodiment of the disclosure, applications based on various parameters, such as the number of PDCCH candidates or the number of possible CCEs, may be possible. However, detailed descriptions thereof will be omitted.

Different 'TCI state assignment rules' and different 'priority rules' may be applied to UEs by signaling of a base station or capabilities of the UEs.

According to an embodiment of the disclosure, a UE that can simultaneously receive multi-beams through a multi-panel antenna may not apply the priority rule, when monitoring occasions of search spaces to which two or more different TCI states are assigned overlap, and may perform blind decoding on the search spaces simultaneously.

Accordingly, the UE may report, to the base station, information about whether the UE can simultaneously monitor the search spaces to which the different TCI states are assigned, through UE capability signaling related to multi-panel- or multi-beam or UE capability signaling for multi-TCI(beam) PDCCH itself.

Also, the base station may obtain the information about whether the UE can simultaneously monitor the search spaces to which the different TCI states are assigned, and indicate whether or not to actually and simultaneously monitor the search spaces to which the different TCI states are assigned to the UE, through RRC signaling. The RRC signaling may be signaling including at least one of whether to apply the 'TCI state assignment rule' and whether to apply the 'priority rule'.

The base station and the UE may consider a case in which different search spaces overlap, in calculating the limit $M^{total,\mu}$ of the number of PDCCH candidates and the limit $C^{total,\mu}$ of the number of CCEs.

According to an embodiment of the disclosure, when some of monitoring occasions of a CSS (common search space) and a USS (UE-specific search space) overlap although a TCI state ID assigned to the CSS is different from a TCI state ID assigned to the USS, the UE may prioritize a TCI state assigned to the CSS to monitor only the CSS. Alternatively, the UE may apply the TCI state of the CSS to the USS to monitor both the USS and CSS.

1) In the case of monitoring only the CSS by prioritizing the TCI state assigned to the CSS, the UE and the base station may count by excluding the number of PDCCH candidates and the number of CCEs of the USS of which monitoring is omitted from calculations of the limit $M^{total,\mu}$ of the number of PDCCH candidates and the limit $C^{total,\mu}$ of the number of CCEs. Similarly, the UE and the base station may count by excluding a search space overlapping an OFDM symbol set or indicated to a flexible symbol in a slot from calculations of the limit $M^{total,\mu}$ of the number of PDCCH candidates and the limit $C^{total,\mu}$ of the number of CCEs. Also, similarly, the UE and the base station may count by excluding a search space overlapping a RE/RB indicated by a rate matching resource from calculations of the limit $M^{total,\mu}$ of the number of PDCCH candidates and the limit $C^{total,\mu}$ of the number of CCEs.

According to an embodiment of the disclosure, when some of monitoring occasions of two different USSs overlap although TCI state IDs assigned to the two USSs are different from each other, the UE may prioritize a TCI state assigned to a USS having a high priority according to the 'priority rule' to monitor only the corresponding USS. Alternatively, the UE may monitor all overlapping USSs according to UE capability or base station RRC signaling. 1) In the case of monitoring only the USS having the high priority, the UE and the base station may count by excluding the number of PDCCH candidates and the number of CCEs of a USS of which monitoring is omitted from calculations of the limit $M^{total,\mu}$ of the number of PDCCH candidates and the limit $C^{total,\mu}$ of the number of CCEs. Similarly, the UE and the base station may count by excluding a search space overlapping an OFDM symbol set or indicated to a flexible symbol in a slot from calculations of the limit $M^{total,\mu}$ of the number of PDCCH candidates and the limit $C^{total,\mu}$ of the number of CCEs. Also, similarly, the UE and the base station may count by excluding a search space overlapping a RE/RB indicated by a rate matching resource from calculations of the limit $M^{total,\mu}$ of the number of PDCCH candidates and the limit $C^{total,\mu}$ of the number of CCEs.

In the present disclosure, an example of a CORESET has been described, however, this is for convenience of description. Upon an actual application, the disclosure may also be applied in the similar way to a case in which a plurality of CORESETs are configured.

Second Embodiment

An embodiment of the disclosure discloses a method of indicating a plurality of TCI states (QCL or beam information) to each CORESET to assign different TCI states (QCL or beam information) to different monitoring occasions connected to the CORESET.

Figure 12:
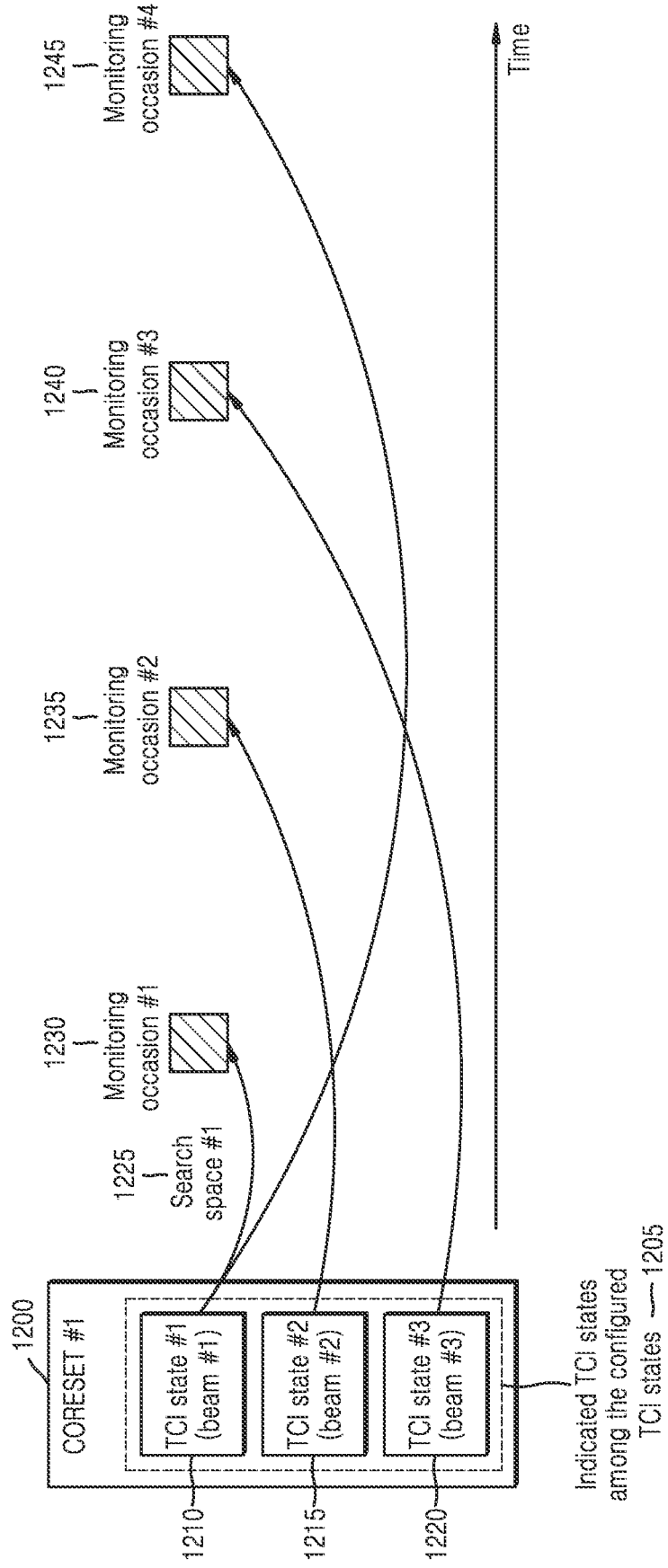
FIG. 12 illustrates a second embodiment of the disclosure.

FIG. 12 illustrates an operation example of a second embodiment.

In FIG. 12, for convenience of description, it is assumed that a search space is connected to a CORESET or a search space refers to the corresponding CORESET ID.

A case in which a plurality of search spaces are connected to a CORESET will be described in detail in embodiments 2-1 and 2-2, which will be described later.

Referring to FIG. 12, a base station may indicate a plurality of TCI states for a CORESET 1200 by using one of the following methods (1205):

Method 1: MAC CE signaling may indicate one or more TCI state IDs from among a TCI state ID list included in a CORESET configuration. In this case, when a UE receives PDCCH TCI indication MAC CE signaling #A and PDCCH TCI indication MAC CE signaling #B in different occasions (in different slots or in different PDSCHs), the UE may update a PDCCH TCI state in the order they are received. Meanwhile, when the UE receives the signaling #A and the signaling #B simultaneously (in the same slot or in the same PDSCH), the UE may consider all TCI states respectively indicated by the individual signalings #A and #B. In the current example, two different MAC CE signalings are assumed, however, expansion to three MAC CE signalings or more may also be possible in the similar way.

Method 2: MAC CE signaling may indicate one or more TCI state IDs from among a TCI state ID list included in a CORESET configuration. According to an embodiment of the disclosure, MAC CE signaling of FIG. 9 may expand to a structure of 3 bytes or more to be improved to indicate one or more TCI state IDs at once.

Method 3: when a reserved bit 910 of MAC CE signaling of FIG. 9 is 0 (or 1), final 6 bits 930 of the corresponding MAC CE signaling may mean a TCI state ID, like they usually do. When the reserved bit 910 is 1 (or 0), the final 6 bits 930 of the corresponding MAC CE signaling may change to indicate a group of TCI state IDs.

According to an embodiment of the disclosure, the UE may use a TCI state ID 930 as it is or understand that all TCI states included in a TCI state ID list configured in the CORESET signaling have been indicated, according to a first bit value 910 of MAC CE signaling. According to another example, the UE may use the TCI state ID 930 as it is or understand that one of TCI state group IDs additionally configured in the CORESET signaling has been indicated, according to the first bit value 910 of MAC CE signaling.

The following indicated one or more TCI states may be respectively assigned to monitoring occasions according to a preset rule. For example, 1210 may be assigned to 1230 and 1245, 1215 may be assigned to 1235, and 1220 may be assigned to 1240. Hereinafter, for convenience of description, the preset rule is referred to as a 'TCI state assignment rule'.

According to an embodiment of the disclosure, the 'TCI state assignment rule' may be to sequentially assign indicated TCI states according to a time order of monitoring occasions.

More particularly, as shown in FIG. 12, in the case in which three TCI states are indicated to a CORESET, a first TCI state 1210 may be assigned to a first monitoring occasion 1230, a second TCI state 1215 may be assigned to a second monitoring occasion 1235, a third TCI state 1220 may be assigned to a third monitoring occasion 1240, and then the first TCI state 1210 may be again assigned to a fourth monitoring occasion 1245, based on when the corresponding TCI states are indicated (1205) and initially applied, for example, after ACK for MAC CE signaling indicating the corresponding TCI states is reported. The 'TCI state assignment rule' may easily expand to when the number of TCI states assigned to a CORESET and the number of monitoring occasions to which the TCI states will be assigned are different from those described above.

The above description has been given based on a time order of monitoring occasions, as an embodiment of the disclosure. However, similar to the above, the above description of the disclosure may be applied based on any ones of 'monitoring slots', 'aggregation levels', and 'values notified through extra RRC signaling'.

2-1 Embodiment

The present embodiment may provide a method of indicating a plurality of TCI states (QCL or beam information)

for each CORESET to assign different TCI states (QCL or beam information) to different monitoring occasions connected to the CORESET.

Figure 13:
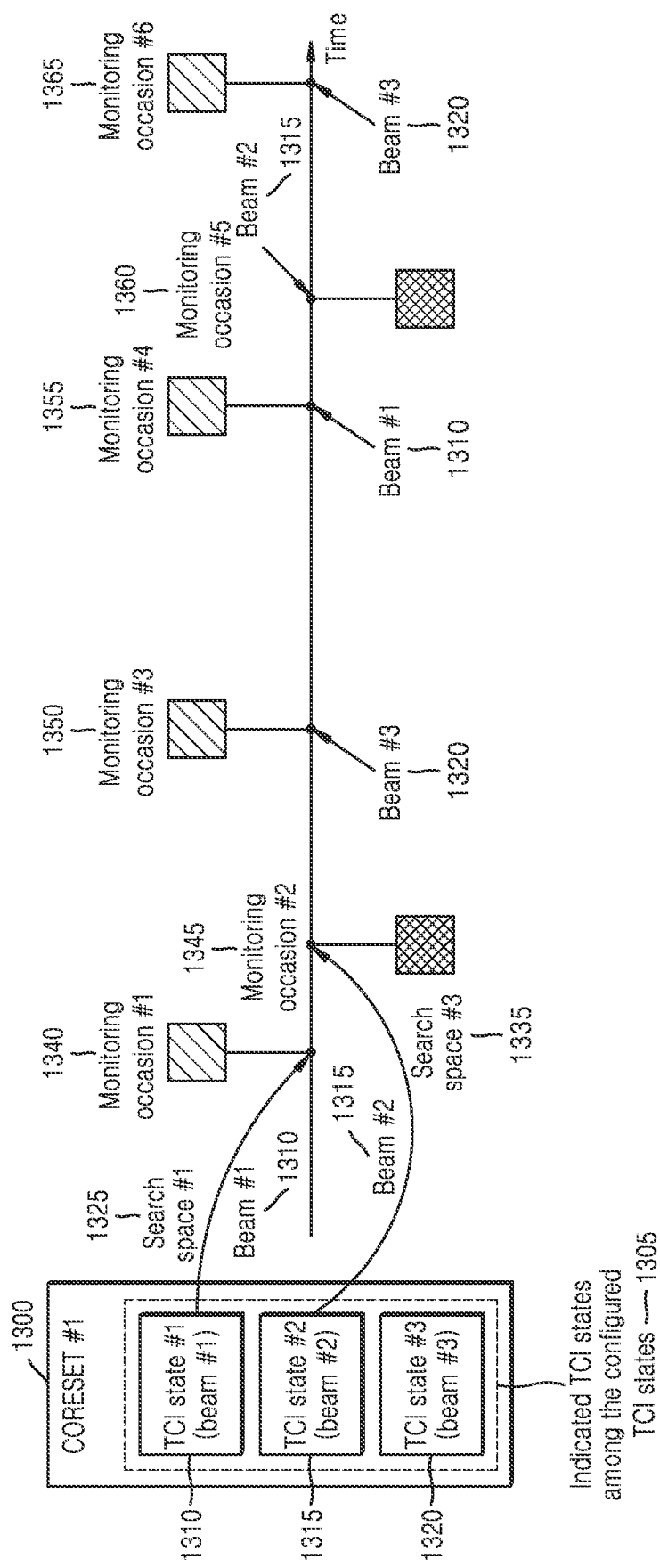
FIG. 13 illustrates a 2-1 embodiment of the disclosure.

FIG. 13 illustrates an operation example of a 2-1 embodiment. The 2-1 embodiment may be expansion of the second embodiment (a search space is connected to a CORESET), and provide an example of a TCI state assignment method for a case in which a plurality of search spaces are connected to a CORESET.

Referring to FIG. 13, a base station may indicate a plurality of TCI states for a CORESET 1310 by using one of the following methods (1305):

Method 1: MAC CE signaling may indicate one or more TCI state IDs from among a TCI state ID list included in a CORESET configuration. In this case, when a UE receives PDCCH TCI indication MAC CE signaling #A and PDCCH TCI indication MAC CE signaling #B in different occasions (in different slots or in different PDSCHs), the UE may update a PDCCH TCI state in the order received. Meanwhile, when the UE receives the signaling #A and the signaling #B simultaneously (in the same slot or in the same PDSCH), the UE may consider all TCI states respectively indicated by the individual signalings #A and #B. In the current example, two different MAC CE signalings are assumed, however, expansion to three MAC CE signalings or more may also be possible in the similar way.

Method 2: MAC CE signaling may indicate one or more TCI state IDs from among a TCI state ID list included in a CORESET configuration. According to an embodiment of the disclosure, MAC CE signaling of FIG. 9 may expand to a structure of 3 bytes or more to be improved to indicate one or more TCI state IDs at once.

Method 3: when a reserved bit 910 of MAC CE signaling of FIG. 9 is 0 (or 1), final 6 bits 930 of the corresponding MAC CE signaling may mean a TCI state ID, like they usually do, or when the reserved bit 910 is 1 (or 0), the final 6 bits 930 of the corresponding MAC CE signaling may change to indicate a group of TCI state IDs.

According to an embodiment of the disclosure, the UE may use the TCI state ID 930 as it is or understand that all TCI states included in a TCI state ID list configured in the CORESET signaling have been indicated, according to the first bit value 910 of the MAC CE signaling. According to another example, the UE may use the TCI state ID 930 as it is or understand that one of TCI state group IDs additionally configured in the CORESET signaling has been indicated, according to the first bit value 910 of the MAC CE signaling.

The following indicated one or more TCI states may be respectively assigned to monitoring occasions according to a preset rule. Hereinafter, for convenience of description, the preset rule is referred to as a 'TCI state assignment rule'.

According to an embodiment of the disclosure, the 'TCI state assignment rule' may be to sequentially assign indicated TCI states according to a time order of monitoring occasions.

When two or more search spaces are connected to the corresponding CORESET, monitoring occasions of the respective search spaces may be integrated into one according to a time order. For example, when two search spaces refer to a CORESET 1300, monitoring occasions ({1340, 1350, 1355, 1365} in the case of 1325 and {1345, 1360} in the case of 1335) of the search spaces may be arranged according to a time order (1340 to 1365). Thereafter, indicated TCI states may be sequentially assigned to the integrated and arranged monitoring occasions. For example, 1310 may be assigned to 1340 and 1355, 1315 may be assigned to 1345 and 1360, and 1320 may be assigned to 1350 and 1365.

More particularly, as shown in FIG. 13, in the case in which three TCI states are indicated to a CORESET, a first TCI state 1310 may be assigned to a first monitoring occasion 1340, a second TCI state 1315 may be assigned to a second monitoring occasion 1345, a third TCI state 1320 may be assigned to a third monitoring occasion 1350, and then the first TCI state 1310 may be again assigned to a fourth monitoring occasion 1355, based on when the corresponding TCI states are indicated (1305) and initially applied, for example, after ACK for MAC CE signaling indicating the corresponding TCI states is reported. The above-described operation may be performed repeatedly until new TCI states are indicated. The TCI state assignment rule may easily expand to when the number of TCI states assigned to a CORESET and the number of monitoring occasions to which the TCI states will be assigned are different from those described above.

The above description has been given based on a time order of monitoring occasions, as an embodiment of the disclosure. However, similar to the above, the above description of the disclosure may be applied based on any ones of 'monitoring slots', 'aggregation levels', and 'values notified through extra RRC signaling'.

2-2 Embodiment

The present embodiment provides a method of indicating a plurality of TCI states (QCL or beam information) for each CORESET to assign different TCI states (QCL or beam information) to different monitoring occasions connected to the CORESET.

Figure 14:
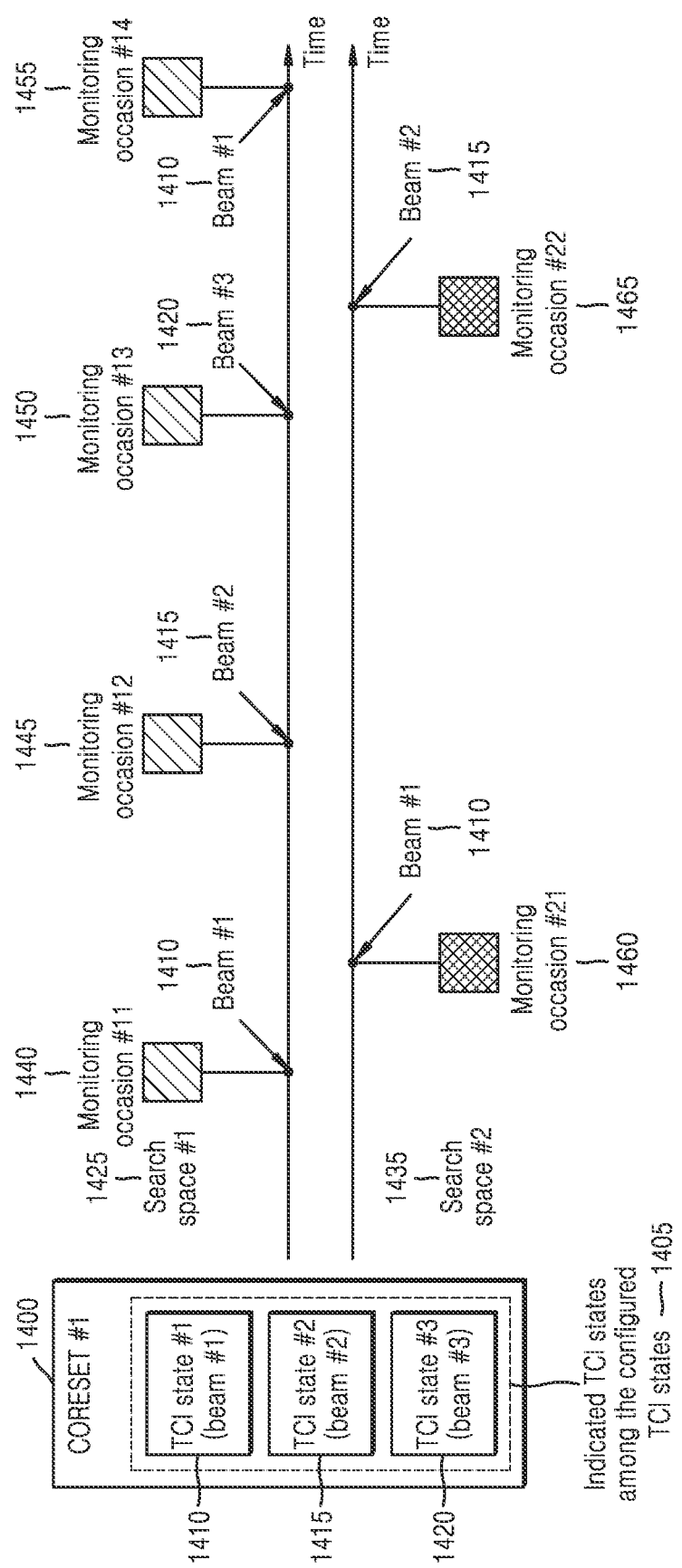
FIG. 14 illustrates a 2-2 embodiment of the disclosure.

FIG. 14 illustrates an operation example of a 2-2 embodiment.

The 2-2 embodiment may be expansion of the second embodiment (a search space is connected to a CORESET), and provide an example of a TCI state assignment method for a case in which a plurality of search spaces are connected to a CORESET.

Referring to FIG. 14, a base station may indicate a plurality of TCI states for a CORESET 1410 by using one of the following methods (1405):

Method 1: MAC CE signaling may indicate one or more TCI state IDs from among a TCI state ID list included in a CORESET configuration. In this case, when a UE receives PDCCH TCI indication MAC CE signaling #A and PDCCH TCI indication MAC CE signaling #B in different occasions (in different slots or in different PDSCHs), the UE may update a PDCCH TCI state in the order received. Meanwhile, when the UE receives the signaling #A and the signaling #B simultaneously (in the same slot or in the same PDSCH), the UE may consider all TCI states respectively indicated by the individual signalings #A and #B. In the current example, two different MAC CE signalings are assumed, however, expansion to three MAC CE signalings or more may also be possible in the similar way.

Method 2: MAC CE signaling may indicate one or more TCI state IDs from among a TCI state ID list included in a CORESET configuration. According to an embodiment of the disclosure, MAC CE signaling of FIG. 9 may expand to a structure of 3 bytes or more to be improved to indicate one or more TCI state IDs at once.

Method 3: when a reserved bit 910 of MAC CE signaling of FIG. 9 is 0 (or 1), final 6 bits 930 of the corresponding MAC CE signaling may mean a TCI state ID, like they usually do, or when the reserved bit 910 is 1 (or 0), the final 6 bits 930 of the corresponding MAC CE signaling may change to indicate a group of TCI state IDs.

According to an embodiment of the disclosure, the UE may use the TCI state ID 930 as it is or understand that all TCI states included in a TCI state ID list configured in the CORESET signaling have been indicated, according to the first bit value 910 of the MAC CE signaling. According to another example, the UE may use the TCI state ID 930 as it is or understand that one of TCI state group IDs additionally configured in the CORESET signaling has been indicated, according to the first bit value 910 of the MAC CE signaling.

The following indicated one or more TCI states may be respectively assigned to monitoring occasions according to a preset rule. Hereinafter, for convenience of description, the preset rule is referred to as a 'TCI state assignment rule'.

According to an embodiment of the disclosure, the 'TCI state assignment rule' may be to sequentially assign indicated TCI states according to a time order of monitoring occasions.

When two or more search spaces are connected to the corresponding CORESET, monitoring occasions of the respective search spaces may be counted individually. For example, when two search spaces 1425 and 1435 refer to a CORESET 1400, monitoring occasions ({1440, 1445, 1450, 1455} in the case of 1425 and {1460, 1465} in the case of the search space 1435) of each search space may be arranged according to a time order. Thereafter, indicated TCI states may be sequentially assigned to the arranged monitoring occasions for each search space. That is, according to an embodiment of the disclosure, it may be interpreted that the embodiment 2 is executed for each search space.

More particularly, as shown in FIG. 14, in the case in which three TCI states are indicated to a CORESET, a first TCI state 1410 may be assigned to a first monitoring occasion 1440 of a first search space, a second TCI state 1415 may be assigned to a second monitoring occasion 1445 of the first search space, a third TCI state 1420 may be assigned to a third monitoring occasion 1450 of the first search space, and then the first TCI state 1410 may be again assigned to a fourth monitoring occasion 1455 of the first search space, based on when the corresponding TCI states are indicated (1405) and initially applied, for example, after ACK for MAC CE signaling indicating the corresponding TCI states is reported.

Assignment that is similar to the above-described assignment may be also applied to the second search space 1435. In the example of FIG. 14, the first TCI state 1410 may be assigned to a first monitoring occasion 1460 of the second search space 1435, and the second TCI state 1415 may be assigned to a second monitoring occasion 1465 of the second search space 1435. The above-described operation may be performed repeatedly until new TCI states are indicated. The TCI state assignment rule may easily expand to when the number of TCI states assigned to a CORESET, the number of monitoring occasions to which the TCI states will be assigned, and the number of search spaces connected to the corresponding CORESET are different from those described above.

The above description has been given based on a time order of monitoring occasions, as an embodiment of the disclosure. However, similar to above, the above description of the disclosure may be applied based on any ones of 'monitoring slots', 'aggregation levels', and 'values notified through extra RRC signaling'.

In the embodiment 2-2, after one or more TCI states for a CORESET are indicated and a TCI state is assigned to each search space, search spaces being assigned two or more different TCI states may overlap in a specific monitoring occasion. In this case, a UE may apply a priority rule to attempt to detect a PDCCH in a search space having a highest priority. Hereinafter, for convenience of description, this is referred to as a 'priority rule'.

According to an embodiment of the disclosure, the 'priority rule' may be configured such that priorities of search spaces are determined, (1) in an ascending (descending) order of search space IDs, (2) in an ascending (descending) order of monitoring slot level periods (in an ascending (descending) order of slot offsets in the case of the same period), (3) according to timings of monitoring symbols in slots, (4) in an ascending (descending) order of the numbers of monitoring symbols in slots, (5) in an descending (ascending) order of maximum aggregation levels, (6) in a descending (ascending) order with respect to a maximum value of the number of PDCCH candidates (the number of CCEs) for each aggregation level, or (7) in a descending (ascending) order with respect to a total number of PDCCH candidates (the number of CCEs) for each aggregation level.

According to the method (1), simple base station implementation based on search space IDs may be possible.

According to the methods (2) to (4), an important or urgent PDCCH may be assigned to a search space of a short period.

According to the method (5), a PDCCH having a high aggregation level, that is, high reliability may be preferentially received.

According to the methods (6) and (7), importance may be implicitly determined according to a set number of blind decoding.

Different 'priority rules' may be applied to different UEs by signaling of a base station or capabilities of the UEs.

According to an embodiment of the disclosure, a UE that can simultaneously receive multi-beams through a multi-panel antenna may not apply the priority rule, when monitoring occasions of search spaces to which two or more different TCI states are assigned overlap, and may perform blind decoding on the search spaces simultaneously.

Accordingly, the UE may report, to the base station, information about whether the UE can simultaneously monitor the search spaces to which the different TCI states are assigned, through UE capability signaling related to multi-panel or multi-beam or UE capability signaling for multi-TCI(beam) PDCCH itself.

Also, thereby, the base station may obtain the information about whether the UE can simultaneously monitor the search spaces to which the different TCI states are assigned, and then indicate, to the UE, whether to actually and simultaneously monitor the search spaces to which the different TCI states are assigned, through RRC signaling.

In the embodiments 2-1 and 2-2, the base station and the UE may consider a case in which different search spaces overlap, in calculating the limit $M^{total,\mu}$ of the number of PDCCH candidates and the limit $C^{total,\mu}$ of the number of CCEs.

According to an embodiment of the disclosure, when some of monitoring occasions of a CSS (common search space) and a USS (UE-specific search space) overlap although a TCI state ID assigned to the CSS is different from a TCI state ID assigned to the USS, 1) the UE may prioritize the TCI state assigned to the CSS to monitor only the CSS. Alternatively, 2) the UE may apply the TCI state of the CSS to the USS to monitor both the USS and CSS.

1) In the case of prioritizing the TCI state assigned to the CSS to monitor only the CSS, the UE and the base station may count by excluding the number of PDCCH candidates and the number of CCEs of the USS of which monitoring is omitted from calculations of the limit $M^{total,\mu}$ of the number of PDCCH candidates and the limit $C^{total,\mu}$ of the number of CCEs. Similarly, the UE and the base station may count by excluding a search space overlapping an OFDM symbol set or indicated to a flexible symbol in a slot from calculations of the limit $M^{total,\mu}$ of the number of PDCCH candidates and the limit $C^{total,\mu}$ of the number of CCEs. Also, similarly, the UE and the base station may count by excluding a search space overlapping a RE/RB indicated by a rate matching resource from calculations of the limit $M^{total,\mu}$ of the number of PDCCH candidates and the limit $C^{total,\mu}$ of the number of CCEs.

According to an embodiment of the disclosure, when some of monitoring occasions of two different USSs overlap although TCI state IDs assigned to the two USSs are different from each other, 1) the UE may prioritize a TCI state assigned to a USS having a high priority according to the 'priority rule' to monitor only the USS. Alternatively, 2) the UE may monitor all overlapping USSs according to UE capability or base station RRC signaling. 1) In the case of monitoring only the USS having the high priority, the UE and the base station may count by excluding the number of PDCCH candidates and the number of CCEs of a USS of which monitoring is omitted from calculations of the limit $M^{total,\mu}$ of the number of PDCCH candidates and the limit $C^{total,\mu}$ of the number of CCEs. Similarly, the UE and the base station may count by excluding a search space overlapping an OFDM symbol set or indicated to a flexible symbol in a slot from calculations of the limit $M^{total,\mu}$ of the number of PDCCH candidates and the limit $C^{total,\mu}$ of the number of CCEs. Also, similarly, the UE and the base station may count by excluding a search space overlapping a RE/RB indicated by a rate matching resource from calculations of the limit $M^{total,\mu}$ of the number of PDCCH candidates and the limit $C^{total,\mu}$ of the number of CCEs.

In the present disclosure, an example of a CORESET has been described, however, this is for convenience of description. Upon an actual application, the disclosure may also be applied in the similar way to a case in which a plurality of CORESETs are configured.

Third Embodiment

An embodiment of the disclosure discloses an operation method of a UE when TCI state configurations mismatch between different CORESETs.

Figure 15:
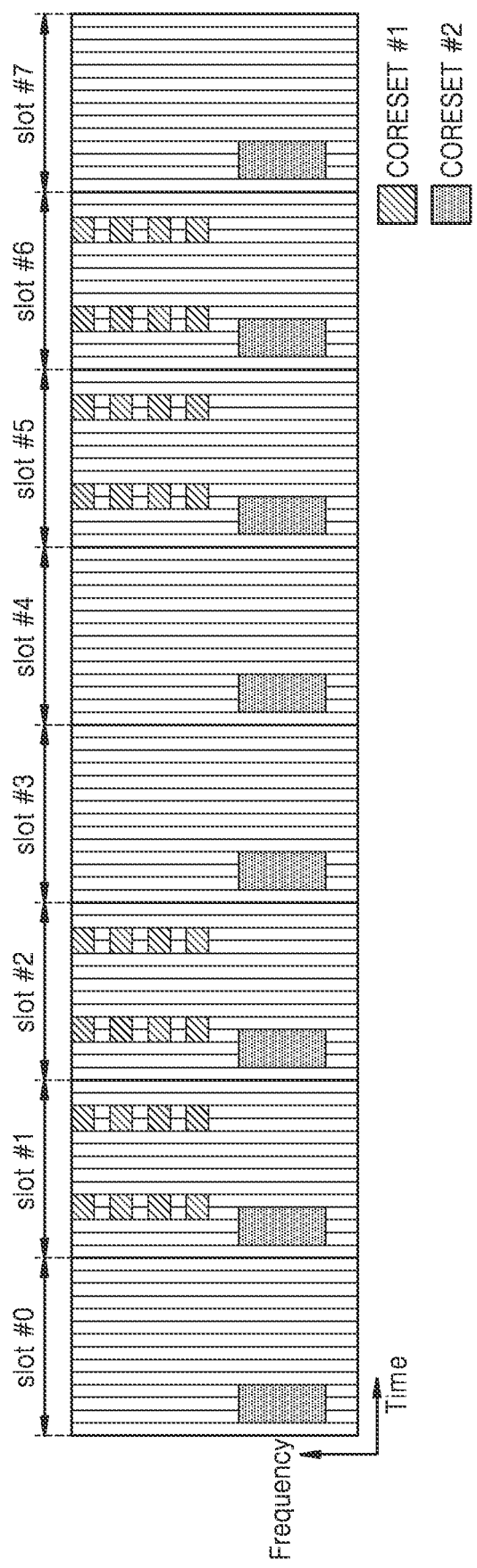
FIG. 15 illustrates a third embodiment of the disclosure.

FIG. 15 illustrates an example of monitoring occasions according to configurations of CORESETs and search spaces.

In FIG. 15, it is assumed that a search space #1 is connected to CORESET #1, a search space #2 is connected to CORESET #2, and the search spaces #1 and #2 are configured as follows.
Search space config #1
controlResourceSetId=1,
monitoringSlotPeriodicityAndOffset=sl4, 1
duration=2,
monitoringSymbolsWithinSlot=00011000001100
Search space config #2
controlResourceSetId=2,
monitoringSlotPeriodicityAndOffset=sl1
monitoringSymbolsWithinSlot=01110000000000

Referring to FIG. 15, according to the above configurations, a collision may occur between search spaces of different CORESETs in slot #1 and slot #5. At this time, a UE may receive indications of different TCI states for CORESET #1 and CORESET #2 at a time of the collision, and, in this case, one of the following methods may be used.

Method 1: when one or more search spaces connected to different CORESETs can be simultaneously monitored, that is, when monitoring occasions of search spaces connected to different CORESETs share one or more OFDM symbols, the UE may not receive a configuration, assignment, or indication of QCL type D for the corresponding CORESETs. This means that a case in which a UE simultaneously monitors two CORESETs/search spaces corresponds to a case in which no reception beam is applied, that is, a low-frequency band (frequency range 1 (FR1)) of 6 GHz or less.

Method 2: when one or more search spaces connected to different CORESETs can be simultaneously monitored, that is, when monitoring occasions of search spaces connected to different CORESETs share one or more OFDM symbols, the UE may not receive a configuration, assignment, or indication of different reference RSs for QCL type D for the corresponding CORESETs. That is, the UE may simultaneously monitor only CORESETs/search spaces for which the same reference RS for QCL type D is configured. This functions to ensure such that the UE uses the same reception beam to simultaneously monitor two CORESETs/search spaces.

Method 3: when one or more search spaces connected to different CORESETs can be simultaneously monitored, that is, when monitoring occasions of search spaces connected to different CORESETs share one or more OFDM symbols, the UE may apply different rules to calculations of the limit of the number of PDCCH candidates and the limit $C^{total,\mu}$ of the number of CCEs according to presense/absence of a configuration, assignment, or indication of QCL type D. For example, when QCL type D is configured, assigned, or indicated, the UE may assume that different beams may be needed to receive individual CORESETs, and the UE may count only one of overlapping search spaces according to the above-described priority rule for the limits of the number of PDCCH candidates and the number of CCEs. Meanwhile, when no QCL type D is configured, assigned, or indicated, the UE may assume that each CORESET is receivable through a common beam without any reception beam, and may count all overlapping search spaces for the limits of the number of PDCCH candidates and the number of CCEs. At this time, the UE may count by excluding a search space overlapping an OFDM symbol set or indicated to a flexible symbol in a slot from calculations of the limit $M^{total}$, of the number of PDCCH candidates and the limit $c^{total}$, of the number of CCEs, and the UE may count by excluding a search space overlapping a RE/RB indicated by a rate matching resource from calculations of the limit $M^{total,\mu}$ of the number of PDCCH candidates and the limit $C^{total,\mu}$ of the number of CCEs.

Method 4: when one or more search spaces connected to different CORESETs can be simultaneously monitored, that is, when monitoring occasions of search spaces connected to different CORESETs share one or more OFDM symbols, the UE may not receive a configuration, assignment, or indication of different TCI states for the corresponding CORESETs. This functions to ensure such that the UE does not assume different QCLs to simultaneously monitor two CORESETs/search spaces.

Method 5: when one or more search spaces connected to different CORESETs can be simultaneously monitored, that is, when monitoring occasions of search spaces connected to different CORESETs share one or more OFDM symbols, the UE may arbitrarily monitor a plurality of CORESETs/search spaces to which different TCI states are indicated according to UE capability signaling reported to the base station.

Method 6: when one or more search spaces connected to different CORESETs can be simultaneously monitored, that is, when monitoring occasions of search spaces connected to different CORESETs share one or more OFDM symbols, the UE may monitor only a CORESET/search space having a highest priority according to a preset priority. Priorities may be determined according to various criteria, such as an ascending (descending) order of Cell-IDs, an ascending (descending) order of CCs or BWP IDs, or an ascending (descending) order of CORESETs or search space IDs.

Method 7: when one or more search spaces connected to different CORESETs can be simultaneously monitored, that is, when monitoring occasions of search spaces connected to different CORESETs share one or more OFDM symbols, the UE may assume a TCI state indicated to a CORESET having a highest priority according to the preset priorities for all CORESETs overlapping the corresponding monitoring occasion. Priorities may be determined according to various criteria, such as an ascending (descending) order of Cell-IDs, an ascending (descending) order of CCs or BWP IDs, or an ascending (descending) order of CORESETs or search space IDs.

The above-described methods 1 to 7 may be not exclusive, and may be selectively used by a condition, such as, for example, a frequency area (FR1 vs. FR2). According to an embodiment of the disclosure, the UE may apply the method 2 to FR2 (above 6 GHz), and the method 1 to FR1 (below 6 GHz).

Figure 16:
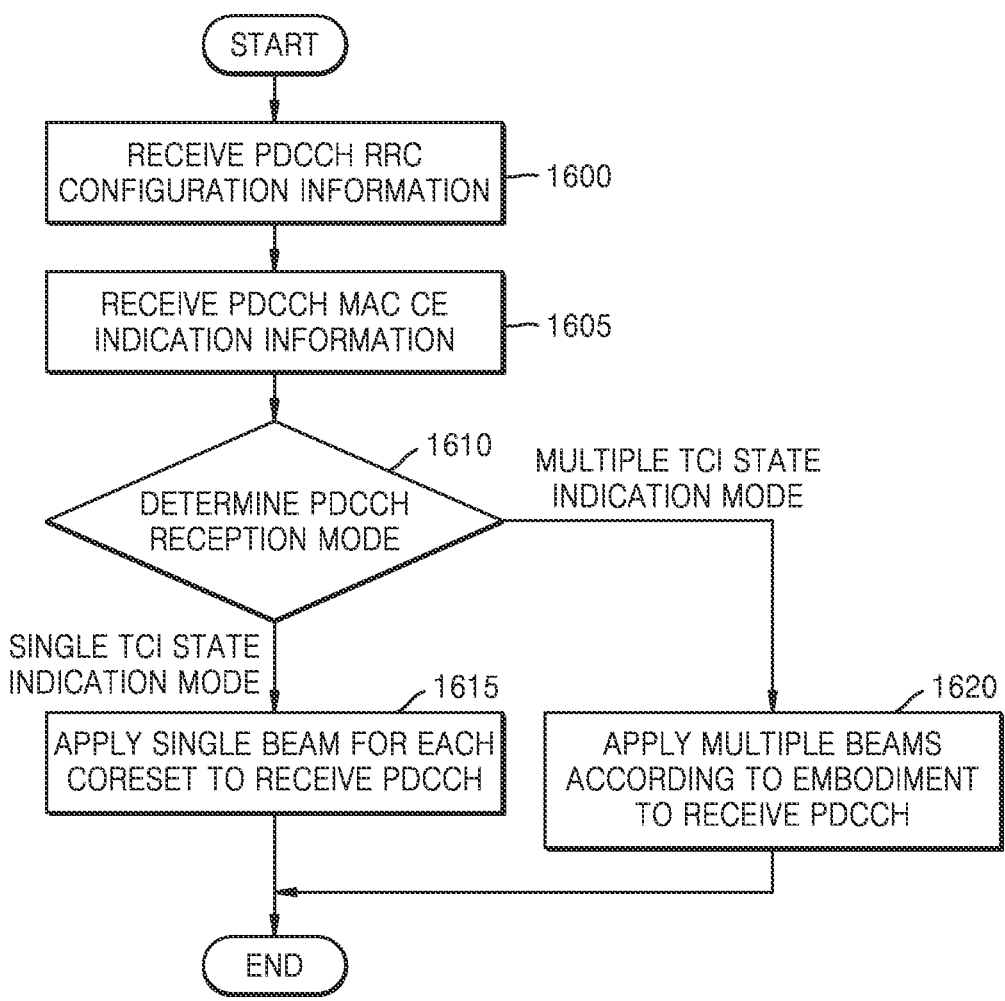
FIG. 16 illustrates an order of PDCCH reception operations of a user equipment (UE) according to embodiments of the disclosure.

FIG. 16 illustrates an operation order of a UE according to an embodiment of the disclosure.

Referring to FIG. 16, the UE may receive PDCCH RRC configuration information, in operation 1600.

The UE according to an embodiment of the disclosure may receive PDCCH TCI state indication information through MAC CE signaling, in operation 1605.

The UE according to an embodiment of the disclosure may determine a reception mode for the corresponding PDCCH, in operation 1610.

When the UE determines that the reception mode for the PDCCH is a single TCI state indication mode in operation 1610, the UE may assume a single TCI state for each CORESET to receive a PDCCH, in operation 1615.

When the UE determines that the reception mode for the PDCCH is a multiple TCI states indication mode in operation 1610, the UE may assume multiple TCI states for each CORESET to receive a PDCCH, according to embodiments of the disclosure, in operation 1620.

According to an embodiment of the disclosure, the UE may receive a configuration of at least one or more TCI states connected to a CORESET through RRC, receive an indication of a TCI state including beam information of a PDCCH among the at least one or more TCI states through MAC CE, and receive the PDCCH based on the TCI state including the beam information of the PDCCH.

According to an embodiment of the disclosure, the UE may sense a collision between at least one or more search spaces connected to different CORESETs, and assign different TCI states to the different CORESETs based on a result of the sensed collision.

Figure 17:
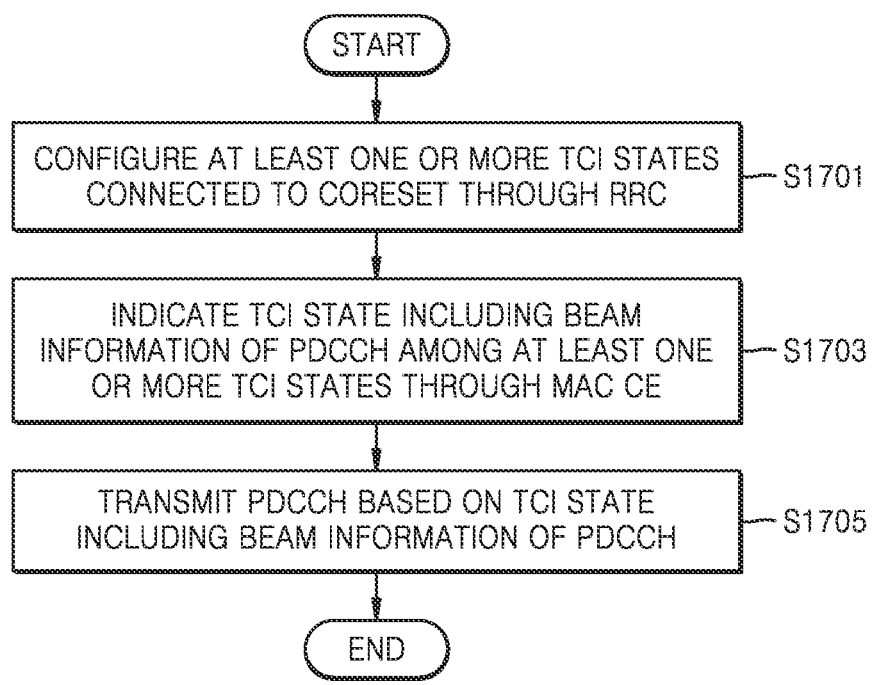
FIG. 17 illustrates an order of operations of a base station according to an embodiment of the disclosure.

FIG. 17 illustrates an operation order of a base station according to the disclosure.

In operation S1701, the base station may configure at least one or more TCI states connected to a CORESET through RRC.

In operation S1703, the base station may indicate a TCI state including beam information of a PDCCH among the at least one or more TCI states through MAC CE.

According to an embodiment of the disclosure, the base station may indicate different TCI states for different search spaces connected to a CORESET.

According to an embodiment of the disclosure, the base station may indicate different TCI states for different monitoring occasions.

According to an embodiment of the disclosure, the base station may indicate different TCI states for different monitoring occasions in a search space connected to a CORESET.

According to an embodiment of the disclosure, the base station may indicate different TCI states for different monitoring occasions in a plurality of search spaces connected to a CORESET.

According to an embodiment of the disclosure, the base station may indicate, for a plurality of search spaces connected to a CORESET, the same TCI state configured at different monitoring occasions to a plurality of different search spaces.

According to an embodiment of the disclosure, the base station may configure a TCI state list including at least one or more TCI state IDs, and indicate at least one or more TCI state IDs from among the configured TCI state list.

According to an embodiment of the disclosure, the base station may indicate a TCI state by using a reserved bit of MAC CE.

In operation S1705, the base station may transmit the PDCCH based on the TCI state including the beam information of the PDCCH.

Figure 18:
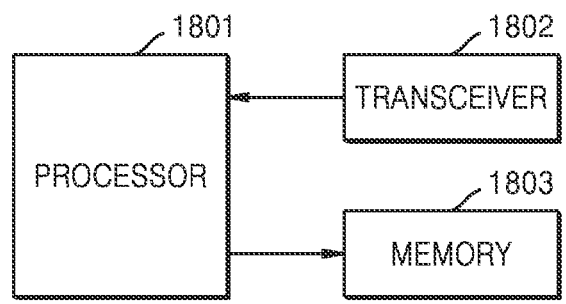
FIG. 18 is a block diagram illustrating an internal structure of a UE according to an embodiment of the disclosure.

FIG. 18 illustrates a structure of a UE according to an embodiment of the disclosure.

Referring to FIG. 18, the UE may include a processor 1801, a transceiver 1802, and a memory 1803. In the disclosure, the processor 1801 may be defined as a circuit, an application-specific integrated circuit, or at least one processor.

The processor 1801 according to an embodiment of the disclosure may control overall operations of the UE. For example, the processor 1801 may control signal flows between blocks to perform operations according to the above-described flowchart. Also, the processor 1801 may write data in the memory 1803 or read data from the memory 1803. Also, the processor 1801 may perform functions of a protocol stack required by a communication standard. For this, the processor 1801 may include at least one processor or microprocessor, or the processor 1801 may be a part of a processor. Also, a part of the transceiver 1802 and the processor 1801 may be referred to as a communication processor (CP).

According to an embodiment of the disclosure, the processor 1801 may control operations of the UE described above with reference to FIGS. 1 to 17.

According to an embodiment of the disclosure, the processor 1801 may control the number of indicated PDCCH TCI states, a TCI state assignment method, etc., in different ways.

According to an embodiment of the disclosure, the processor 1801 may execute a program stored in the memory 1803 to receive a configuration of at least one or more TCI states connected to a CORESET through RRC, receive an indication of a TCI state including beam information of a PDCCH among the at least one or more TCI states through MAC CE, and receive the PDCCH based on the TCI state including the beam information of the PDCCH.

The transceiver 1802 according to an embodiment of the disclosure may perform functions for transmitting and receiving signals through a wireless channel. For example, the transceiver 1802 may perform a function of conversion between baseband signals and bit strings according to a physical layer specification of a system. For example, upon data transmission, the transceiver 1802 may encipher and modulate a transmission bit string to generate complex symbols. Also, upon data reception, the transceiver 1802 may demodulate and decipher a baseband signal to restore a reception bit string. Also, the transceiver 1802 may up-convert a baseband signal into a RF band signal, transmit the RF band signal through an antenna, and down-convert an RF band signal received through the antenna into a baseband signal. For example, the transceiver 1802 may include a transmission filter, a reception filter, an amplifier, a mixer, an oscillator, a DAC, an ADC, etc. Also, the transceiver 1802 may include a plurality of transmission and reception paths. Further, the transceiver 1802 may include at least one antenna array configured with a plurality of antenna elements. In view of hardware, the transceiver 1802 may be configured with a digital circuit and an analog circuit (for example, a radio frequency integrated circuit (RFIC)). Herein, the digital circuit and analog circuit may be implemented as one package. Also, the transceiver 1802 may include a plurality of RF chains.

The memory 1803 according to an embodiment of the disclosure may store data, such as basic programs, application programs, and setting information, for operations of the UE. The memory 1803 may be configured with a volatile memory, a non-volatile memory, or a combination of a volatile memory and a non-volatile memory. Also, the memory 1803 may provide stored data according to a request from the processor 1801. The memory 1803 may store at least one of information transmitted/received through the transceiver 1802 and information generated by the processor 1801.

Figure 19:
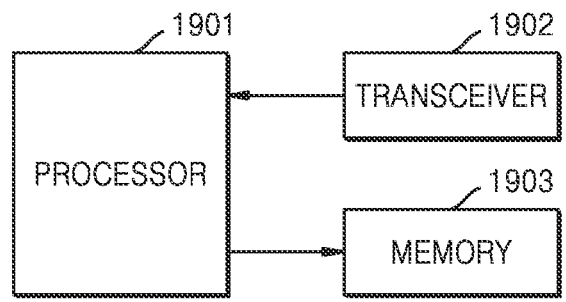
FIG. 19 is a block diagram illustrating an internal structure of a base station according to an embodiment of the disclosure.

FIG. 19 illustrates a structure of a base station according to an embodiment of the disclosure.

Referring to FIG. 19, the base station may include a processor 1901, a transceiver 1902, and a memory 1903. In the disclosure, the processor 1901 may be defined as a circuit, an application-specific integrated circuit, or at least one processor.

The processor 1901 according to an embodiment of the disclosure may control overall operations of the base station. For example, the processor 1901 may control signal flows between blocks to perform operations according to the above-described flowchart. Also, the processor 1901 may write data in the memory 1903 or read data from the memory 1903. Also, the processor 1901 may perform functions of a protocol stack required by a communication standard. For this, the processor 1901 may include at least one processor or microprocessor, or the processor 1901 may be a part of a processor. Also, a part of the transceiver 1902 and the processor 1901 may be referred to as a CP.

According to an embodiment of the disclosure, the processor 1901 may control operations of the base station described above with reference to FIGS. 1 to 17.

According to an embodiment of the disclosure, the processor 1901 may control a series of processes to enable the base station to operate according to the above-described embodiments of the disclosure. For example, the processor 1901 may control the number of indicated PDCCH TCI states, a TCI state assignment method, etc., according to an embodiment of the disclosure, in different ways.

According to an embodiment of the disclosure, the processor 1901 may perform a multi-beam indication for a PDCCH, through a PDCCH beam configuration method, with a low signaling load, and raise PDCCH reception reliability or increase a simultaneously receivable PDCCH payload, based on the multi-beam indication for the PDCCH.

According to an embodiment of the disclosure, the processor 1901 may execute a program stored in the memory 1903 to configure at least one or more TCI states connected to a CORESET through RRC, indicate a TCI state including beam information of a PDCCH among the at least one or more TCI states through MAC CE, and transmit the PDCCH based on the TCI state including the beam information of the PDCCH.

The transceiver 1902 according to an embodiment of the disclosure may perform functions for transmitting and receiving signals through a wireless channel. For example, the transceiver 1902 may perform a function of conversion between baseband signals and bit strings according to a physical layer specification of a system. For example, upon data transmission, the transceiver 1902 may encipher and modulate a transmission bit string to generate complex symbols. Also, upon data reception, the transceiver 1902 may demodulate and decipher a baseband signal to restore a reception bit string. Also, the transceiver 1902 may up-convert a baseband signal into a RF band signal, transmit the RF band signal through an antenna, and down-convert an RF band signal received through the antenna into a baseband signal. For example, the transceiver 1902 may include a transmission filter, a reception filter, an amplifier, a mixer, an oscillator, a DAC, an ADC, etc. Also, the transceiver 1902 may include a plurality of transmission and reception paths. Further, the transceiver 1902 may include at least one antenna array configured with a plurality of antenna elements. In view of hardware, the transceiver 1902 may be configured with a digital circuit and an analog circuit (for example, a RFIC). Herein, the digital circuit and analog circuit may be implemented as one package. Also, the transceiver 1902 may include a plurality of RF chains.

The memory 1903 according to an embodiment of the disclosure may store data, such as basic programs, application programs, and setting information, for operations of the base station. The memory 1903 may be configured with a volatile memory, a non-volatile memory, or a combination of a volatile memory and a non-volatile memory. Also, the memory 1903 may provide stored data according to a request from the processor 1901. The memory 1903 may store at least one of information transmitted/received through the transceiver 1902 and information generated by the processor 1901.

The methods according to the embodiments of the disclosure described in claims or specification thereof may be implemented in hardware, software, or a combination of hardware and software.

When the methods are implemented in software, a computer-readable storage medium storing at least one program (software module) may be provided. The at least one program stored in the computer-readable storage medium may be configured for execution by at least one processor within an electronic device. The at least one program may include instructions that cause the electronic device to execute the methods according to the embodiments of the disclosure described in the claims or specification thereof.

The program (software module or software) may be stored in Random Acess Memory (RAM), a non-volatile memory including a flash memory, Read Only Memory (ROM), an electrically erasable programmable ROM (EEPROM), a magnetic disc storage device, Compact Disc-ROM (CD-ROM), Digital Versatile Discs (DVDs) or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wide LAN (WLAN), or a Storage Area Network (SAN) or a communication network configured in a combination thereof. The storage device may access a device performing the embodiments of the disclosure through an external port. Further, a separate storage device on the communication network may also access the device performing the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience of description, and the disclosure is not limited to the singular or plural form. A component expressed in a plural form may be configured as a single component, or a component expressed in a singular form may be configured as a plurality of components.

While the disclosure has been described with reference to detailed embodiments, it will be understood by one of ordinary skill in the art that various changes may be made therein without departing from the scope of the disclosure. Therefore, the scope of the disclosure is defined not by the embodiments of the disclosure but by the following claims and equivalents thereof.

The invention claimed is:

1. A method performed by a terminal in a wireless communication system, the method comprising:
receiving radio resource control (RRC) signaling; for configuring a plurality of transmission configuration indicator (TCI) states associated with a control resource set (CORESET);
receiving medium access control (MAC) control element (CE) indicating at least two TCI states for the CORESET among the plurality of TCI states; and
receiving a physical downlink control channel (PDCCH) based on the at least two TCI states indicated by the MAC CE,
wherein the MAC CE comprises at least three bytes, and
wherein the MAC CE comprises a field indicating an identifier of the CORESET and at least two fields respectively indicating identifiers of the at least two TCI states.

2. The method of claim 1, wherein the at least two TCI states include different TCI states.

3. The method of claim 1, wherein the at least two TCI states are associated with one search space in the CORESET.

4. The method of claim 1, wherein the at least two TCI states are associated with different search spaces in the CORESET.

5. The method of claim 1, wherein the MAC CE further comprises a field indicating an identifier of a serving cell.

6. A method performed by a base station in a wireless communication system, the method comprising:
transmitting, radio resource control (RRC) signaling for configuring a plurality of transmission configuration indicator (TCI) states associated with a control resource set (CORESET);
transmitting medium access control (MAC) control element (CE) indicating at least two TCI states for the CORESET among the plurality of TCI states; and
transmitting a physical downlink control channel based on the at least two TCI states indicated by the MAC CE,
wherein the MAC CE comprises at least three bytes, and
wherein the MAC CE comprises a field indicating an identifier of the CORESET and at least two fields respectively indicating identifiers of the at least two TCI states.

7. The method of claim 6, wherein the at least two TCI states include different TCI states.

8. The method of claim 6, wherein the at least two TCI states are associated with one search space in the CORESET.

9. The method of claim 6, wherein the at least two TCI states are associated with different search spaces in the CORESET.

10. The method of claim 6, wherein the MAC CE further comprises a field indicating an identifier of a serving cell.

11. A terminal in a wireless communication system, the terminal comprising:
a transceiver; and
at least one processor coupled to the transceiver and configured to control the transceiver to:
receive radio resource control (RRC) signaling for configuring a plurality of transmission configuration indicator (TCI) states associated with a control resource set (CORESET),
receive medium access control (MAC) control element (CE) indicating at least two TCI states for the CORESET among the plurality of TCI states, and
receive a physical downlink control channel (PDCCH) based
on the at least two TCI states indicated by the MAC CE,
wherein the MAC CE comprises at least three bytes, and
wherein the MAC CE comprises a field indicating an identifier of the CORESET and at least two fields respectively indicating identifiers of the at least two TCI states.

12. The terminal of claim 11, wherein the at least two TCI states include different TCI states.

13. The terminal of claim 11, wherein the at least two TCI states are associated with one search space in the CORESET.

14. The terminal of claim 11, wherein the at least two TCI states are associated with different search spaces in the CORESET.

15. The terminal of claim 11, wherein the MAC CE further comprises a field indicating an identifier of a serving cell.

16. A base station in a wireless communication system, the base station comprising:
a transceiver; and
at least one processor coupled to the transceiver and configured to control the transceiver to:

transmit radio resource control (RRC) signaling for configuring a plurality of transmission configuration indicator (TCI) states associated with a control resource set (CORESET),
transmit medium access control (MAC) control element (CE) indicating at least two TCI states for the CORESET among the plurality of TCI states, and
transmit a physical downlink control channel (PDCCH) based on the at least two TCI states indicated by the MAC CE,
wherein the MAC CE comprises at least three bytes, and
wherein the MAC CE comprises a field indicating an identifier of the CORESET and at least two fields respectively indicating identifiers of the at least two TCI states.

17. The base station of claim 16, wherein the at least two TCI states include different TCI states.

18. The base station of claim 16, wherein the at least two TCI states are associated with one search space in the CORESET.

19. The base station of claim 16, wherein the at least two TCI states are associated with different search spaces in the CORESET.

20. The base station of claim 16, wherein the MAC CE further comprises a field indicating an identifier of a serving cell.

* * * * *